United States Patent [19]

Inagaki et al.

[11] Patent Number: 4,851,322

[45] Date of Patent: Jul. 25, 1989

[54] OPTICAL RECORDING MEDIUM

[75] Inventors: Yoshio Inagaki; Takanori Hioki; Naonori Makino; keiichi Adachi; Yoshiaki Suzuki, all of Minami-Ashigara, Japan

[73] Assignee: Fuji Photo Film Co., Ltd., Kanagawa, Japan

[21] Appl. No.: 79,443

[22] Filed: Jul. 30, 1987

[30] Foreign Application Priority Data

Aug. 6, 1986 [JP] Japan ................................ 61-184500
Oct. 20, 1986 [JP] Japan ................................ 61-248977

[51] Int. Cl.⁴ .......................... G03C 1/72; G11B 7/24; G01D 9/00; B41M 5/26

[52] U.S. Cl. .................................... 430/270; 430/495; 430/945; 346/135.1

[58] Field of Search ........................ 430/945, 495, 270; 346/135.1

[56] References Cited

U.S. PATENT DOCUMENTS 4,548,886 10/1985 Katagiri et al. ..................... 430/945
4,656,121 4/1987 Sato et al. ........................... 430/495
4,761,181 8/1988 Suzuki .
4,763,966 8/1988 Suzuki et al. .

FOREIGN PATENT DOCUMENTS 252342 12/1985 Japan .
108593 5/1986 Japan .

OTHER PUBLICATIONS

English Abstract of Japanese Kokai 59-24692.
English Abstract of Japanese Kokai 58-181689.
English Abstract of Japanese Kokai 58-112792 Abstract of U.S. Pat. No. 4,548,886 by Katagiri et al.
English Abstract of Japanese Kokai 61-31490.
English Abstract of Japanese Kokai 61-25886.
English Abstract of U.S. Pat. No. 4,460,665.

*Primary Examiner*—Paul R. Michl
*Assistant Examiner*—Mark R. Buscher
*Attorney, Agent, or Firm*—Birch, Stewart, Kolasch & Birch

[57] ABSTRACT

A new optical recording medium is herein disclosed, the recording medium comprising a substrate and an optical recording layer formed thereon comprising a dye represented by the following general formula (I):

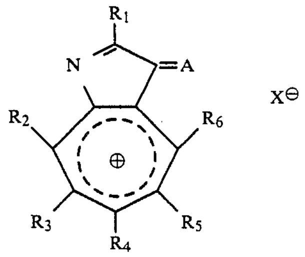

(wherein $R_1$, $R_2$, $R_3$, $R_4$, $R_5$ and $R_6$ respectively represent a hydrogen atom, a halogen atom or a monovalent organic group; A denotes a bivalent organic group which is bonded to the ring through a double bond; and $X^\ominus$ represents an anionic group and is present in a number required to neutralize existing cationic charges, provided that $X^\ominus$ may form an intramolecular salt together with either of $R_1$ to $R_6$ and A or that at least one of the following combinations, $R_2$ and $R_3$; $R_3$ and $R_4$; $R_4$ and $R_5$; $R_5$ and $R_6$ may form a substituted or unsubstituted aromatic carbocyclic ring or aromatic heterocyclic ring); and optionally a quencher. The optical recording medium has a high sensitivity, an extremely high stability to long term storage and a low deterioration during recording operation.

21 Claims, No Drawings

OPTICAL RECORDING MEDIUM

BACKGROUND OF THE INVENTION

1. Field of the Invention

The present invention relates to an optical recording medium and in particular to an optical recording medium of a heat mode type which comprises a novel dye or further a quencher and on which information may be recorded and reproduced by irradiating with a laser beam.

2. Description of the Prior Art

Heretofore, there has been known an information recording medium which makes it possible to record and reproduce information by irradiating a disk-like information recording medium, which is rotating, with a laser beam. As an example of such a recording medium, those of the pit-formation type are well known. In such a pit type optical recording medium of heat mode, a light for recording is utilized as a heat source for forming pits. For example, the recording of information is effected by melting and removing a part of the recording medium while irradiating the medium with light for recording such as a laser beam to form pits thereon and on the other hand, the readout of the information recorded as such pits is effected by detecting these pits while scanning the medium with light for readout.

As a recording layer for such a recording medium, the use of low melting metals or a combination of a low melting metal and a dielectric material such as a resin have conventionally been proposed. However, they suffer a lot of disadvantages such taht they are inferior in storability, they have a low resolution, they have a low recording density and they are less economical.

Recently, it has been proposed to use a dye film as a recording layer, which causes changes in physical properties by irradiating it with light having a rather long wave length and it has already been put into practical use. This kind of dye film in general comprises a variety of dyes or a combination of a dye and a resin. However, these dye films also have problems to be solved such that if this kind of optical recording medium is subjected to repeated erasing operations or repeated irradiation with light for readout or is stored for a long period of time, the sensitivity and the C/N ratio therefore and remarkably reduced.

Under such circumstances, in order to improve the dye in the stability to light and in particular to prevent the decoloration (deterioration during reproduction) thereof owing to the light for readout, it has been proposed to use a dye and a quencher in combination. In this respect, reference is made to, for instance, Japanese Patent Unexamined Published Application Nos. 60-162691; 60-201988; 60-203488 and 60-257290.

However, even if a quencher is used in combination, an optical recording medium having a good resistance to light for readout and/or stability to long term storage has not yet been obtained, in other words, it has not yet been acceptable practically.

SUMMARY OF THE INVENTION

As seen from the aforementioned descriptions, there has not yet been developed an optical recording medium having a good resistance to the light for readout and a high stability to long term storage. Thus, the inventors of this invention have conducted studies on the optical recording medium of heat mode type to eliminate the foregoing problems associated with the conventional ones and the inventors have found that these problems can be effectively solved by employing a specific dye or by a combination of a specific dye and a quencher.

Accordingly, it is a principal object of the present invention to provide an optical recording medium for recording information having a recording layer of dye which is sufficiently stable and is capable of maintaining a sufficient recording properties for a long period of time.

It is another object of the present invention to provide an optical recording medium which is resistant to repeated irradiation with light for readout and/or is excellent in stability to long term storage.

The foregoing and other objects according to the present invention can be effectively accomplished by providing an optical recording medium comprising a substrate having, thereon, provided with a recording layer which contains a dye represented by the following general formula (I):

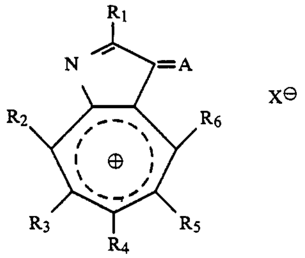

In the above general formula (I), $R_1$, $R_2$, $R_3$, $R_4$, $R_5$ and $R_6$ respectively represent a hydrogen atom, a halogen atom or a monovalent organic group; A represents a bivalent organic group bonded to the ring through a double bond; and $X^\ominus$ is an anionic residue provided that $X^\ominus$ is present in the number needed to neutralize the existing cationic charges and may form an intramolecular salt by being bonded to either of $R_1$, $R_2$, $R_3$, $R_4$, $R_5$, $R_6$ and A. Moreover, at least one of pairs $R_2$ and $R_3$; $R_3$ and $R_4$; $R_4$ and $R_5$; and $R_5$ and $R_6$ may form a substituted or unsubstituted aromatic carbocyclic or aromatic heterocyclic ring.

According to another aspect of the present invention, an optical recording medium comprising a recording layer containing a dye represented by the general formula (I) in combination with a quencher is also provided.

In the compounds represented by the general formula (I), as the substituents $R_1$, $R_2$, $R_3$, $R_4$, $R_5$ and $R_6$, preferred are hydrogen atom, a halogen atoms such as F, Cl, Br and I; hydroxyl group, nitro group, carboxyl group, sulfonate residue, mercapto group or a monovalent organic group having 1 to 30 carbon atoms such as those described below. The monovalent organic group includes, for instance, substituted or unsubstituted alkyl groups such as methyl, ethyl, n-propyl, ispropyl, n-butyl, tert-butyl, n-amyl, tert-amyl, n-hexyl, n-octyl, tert-octyl, 2-ethylhexyl, cyclohexyl, 2-methoxyethyl, 2-phenoxyethyl and n-hexadecyl groups; substituted or unsubstituted aryl groups such as phenyl, tolyl, xylyl, ethylphenyl, methoxyphenyl, ethoxyphenyl, chlorophenyl, nitrophenyl, dimethylaminophenyl, alpha-naphthyl, beta-naphthyl and n-dodecylphenyl groups; substituted or unsubstituted heterocyclic groups such as pyridyl, quinolyl, carbazolyl, furyl, thienyl, pyrazolyl, benzotriazolyl, indazolyl, benzoxazolyl, benzo-thiazolyl, benzoimidazolyl and 5-phenylbenzothiazolyl groups; substituted or unsubstituted aralkyl groups such as benzyl, 2-phenylethyl, 2-phenyl-1-methylethyl, bromobenzyl, 2-bromophenylethyl, methylbenzyl, methoxybenzyl, nitrobenzyl, cyanobenzyl and 4-dodecylbenzyl; acyl groups such as acethyl, propionyl, butyryl, valeryl, pivaloyl, benzoyl, toluoyl, naphthoyl, phthaloyl, trifluoroacetyl, 2-ethylehxanoyl, 2-(2,4-di-tertaminophenoxy)-butyryl and stearoyl groups; substituted or unsubstituted amino groups such as methylamino, dimethylamino, diethylamino, dipropylamino, acetylamino, benzoylamino, stearoylamino, di-(2-hydroxyethyl)-amino, ethyl-2-methanesulfonamido-ethylamino, morpholino, pyrrolidino, piperidino, methylsulfonylamino and p-dodecylbenzenesulfonylamino groups; substituted or unsubstitued styryl groups such as styryl, dimethylaminostyryl, diethylaminostyryl, dipropylaminostyryl, methoxystyryl, ethoxystyryl and methylstyryl groups; substitued or unsubstituted alkoxy groups (the alkyl moieties of the alkoxy groups are the same as the alkyl groups described above); substituted or unsubstituted alkythio groups in which the alkyl moieties thereof are the same as defined above in connection with the alkyl groups; substituted or unsubstituted arylthio groups in which the aryl moieties thereof are the same as defined above with reference to the aryl groups; substituted or unsubstituted heterocyclic thio groups such as 2-pyridylthio, 2-quinolylthio, 2-benzoxazolylthio, 2-benzothiazolylthio, 1,3-diethylbenzimidazole-2-thioyl, 5-phenylbenzothiazole-2-thioyl, 1-phenyltetrazole-2-thioyl and 1-phenylimidazole-2-thioyl groups; substituted or unsubstituted carbamoyl groups such as carbamoyl, methylcarbamoyl, diethylcarbamoyl, phenylcarbamoyl, hexadecyl-carbamoyl and 2-(3-phenylureido)-ethylcarbamoyl groups; substituted or unsubstituted alkoxy-carbonyl groups such as ethyoxycarbonyl, 2-hydroxyethyoxycarbonyl, hexadecyloxycarbonyl and 2-dodecyloxy-ethoxy-carbonyl, groups; substituted or unsubstituted aryloxycarbonyl groups such as phenoxycarbonyl, methoxyphenoxycarbonyl, nitrophenoxycarbonyl, 2,4-di-tert-amylphenoxycarbonyl and p-dodecyl-phenoxycarbonyl groups; and substituted or unsubstituted arylazo groups such as phenylazo, alpha-naphthylazo, beta-naphthylazo, dimethylaminophenylazo, chlorophenylazo, nitrophenylazo, methoxyphenylazo, tolylazo, sulfamoylphenylazo, hexadecylphenylazo and dodecyloxycarbonylphenylazo groups.

Particularly preferred examples of the substituent represented by $R_1$ are hydrogen atom; hydroxyl group; a halogen atom such as F, Cl, Br and I; a substituted or unsubstituted alkyl group having 1 to 20 carbon atoms such as methyl, ethyl, n-propyl, iso-propyl, n-butyl, tert-butyl, n-amyl, tert-amyl, n-hexyl, n-octyl, tert-octyl, 2-ethyl-hexyl, cyclohexyl, 2-methoxy-ethyl, 2-phenoxyethyl and n-hexadecyl groups; a substituted or unsubstituted alkoxy group having 1 to 10 carbon atoms such as methoxy, ethoxy, propoxy, phenoxy and benzyloxy groups; a substituted or unsubstituted phenyl group having 6 to 20 carbon atoms such as phenyl, tolyl, xylyl, ethylphenyl, methoxyphenyl, ethoxyphenyl, chlorophenyl, nitrophenyl, dimethylaminophenyl, tert-amylphenyl and dodecylphenyl groups; a group represented by the general formula: $—OCOR_7$ in which $R_7$ represents a substituted or unsubstituted alkyl group, a substituted or unsubstituted aryl group or a substituted or unsubstituted aralkyl group provided that the number of the carbon atoms included in these groups is not more than 20; a mono- or di-substituted or unsubstituted amino group in which the substituent includes, for instance, a substituted or unsubstituted alkyl group having 1 to 20 carbon atoms such as methyl, ethyl, iso-butyl, sec-butyl, 2-methoxy-ethyl, 2-methanesulfonamido-ethyl, cyclohexyl, 2-ethylhexyl and hexadecyl groups; a substituted or unsubstituted acyl group having 1 to 20 carbon atoms such as formyl, acetyl, benzoyl, phenylacetyl, trifluoroacetyl, 2-ethylhexanoyl, 2-(2,4-di-tert-amylphenoxy)-butyroyl and stearoyl groups; a substituted or unsubstituted phenyl group having 6 to 20 carbon atoms such as phenyl, tolyl, dodecylphenyl, tert-octylphenyl, methoxyphenyl and chlorophenyl groups; a substituted or unsubstituted alkyl-or arylsulfonyl group having 1 to 20 carbon atoms such as methanesulfonyl, benzenesulfonyl, p-toluenesulfonyl, dodecylsulfonyl and octanesulfonyl groups; and these substituents may form a ring such as pyrrolidine, piperidine and morpholine by being bonded with each other.

Particularly preferred $R_2$, $R_3$, $R_4$, $R_5$ and $R_6$ are independently hydrogen atom, a halogen atom such as F, Cl, Br and I; a substituted or unsubstituted alkyl group having 1 to 20 carbon atoms such as methyl, ethyl, propyl, isobutyl, secbutyl, tert-amyl, 2-methoxyethyl, 2-methane-sulfonamido-ethyl, cyclohexyl, tert-octyl, n-octyl, 2-ethylhexyl, 2-methoxyethyl, 2-phenoxyethyl and n-hexadecyl groups; or a substituted or unsubstituted phenyl group having 6 to 20 carbon atoms such as phenyl, tolyl, xylyl, ethylphenyl, methoxyphenyl, ethoxyphenyl, chlorophenyl, nitrophenyl, dimethylaminophenyl, tert-amylphenyl and dodecylphenyl groups.

Examples of the anionic residues represented by $X^{\ominus}$ include hexafluorophosphate, perchlorate, tetrafluoroborate, sulfoacetate, iodide, chloride, bromide, p-toluenesulfonate, an alkyl sulfonate such as methanesulfonate, an alkylsulfate such as ethyl sulfate, an alkyl disulfonate such as ethane disulfonate, a benzene disulfonate such as 1,3-benzenedisulfonate, a halosulfonate such as chlorosulfonate, picrate, tetracylano-ethylene anion, tetracyano-quinodimethane anion, benzotriazole-5-sulfonate, 4-(2-methylthio-tetrazol-1-yl)-benzenesulfonate, acetate, benzoate, sulfate, oxalate, fumarate and formate. These anionic residues may form an intramolecular salt together with A, $R_1$, $R_2$, $R_3$, $R_4$, $R_5$, $R_6$ or $R_7$ if they may be substituted on one of the latter.

Preferred organic groups represented by A are those represented by the following general formulas (1) to (12):

General Formula (1):

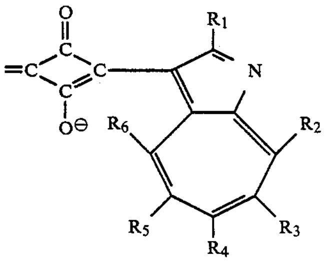

wherein $R_1$ to $R_6$ have the same meanings as those defined above in connection with the general formula (I).

General Formula (2):

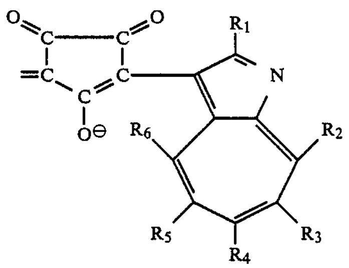

wherein $R_1$ to $R_6$ have the same meanings as those defined above in connection with the general formula (I).

General Formula (3):

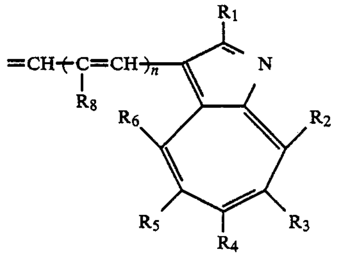

wherein $R_1$ to $R_6$ have the same meanings as those defined above in connection with the general formula (I), $R_8$ represents a hydrogen atom, a nitro group, a cyano group, an alkyl group having 1 to 20 carbon atoms such as methyl, ethyl, propyl and butyl; an aryl group having 6 to 20 carbon atoms such as phenyl, tolyl, xylyl and dodecylphenyl; or an aralkyl group having 7 to 20 carbon atoms such as benzyl, phenylethyl, methoxybenzyl and tert-amylbenzyl and n is an interger of 0, 1 or 2.

General Formula (4):

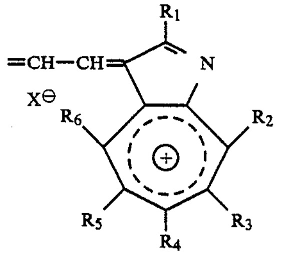

wherein $R_1$ to $R_6$ and $X^{\ominus}$ have the same meanings as those defined above in connection with the general formula (I).

General Formula (5):

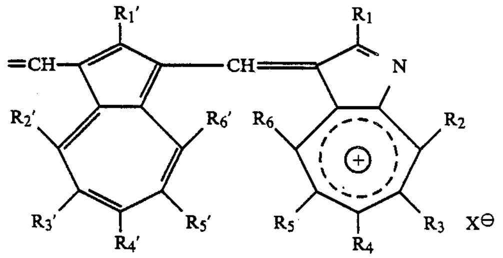

wherein $R_1$ to $R_6$ and $X^{\ominus}$ have the same meanings as those defined above in connection with the general formula (I) and $R_1'$ to $R_6'$, respectively, have the same meanings as those defined above with respect to $R_1$ to $R_6$.

General Formula (6):

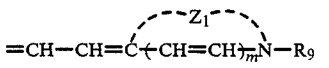

wherein $Z_1$ represents a non-metallic atomic group needed for forming a 5- or 6-membered heterocyclic ring, $R_9$ stands for a substituted or unsubstituted alkyl group, a substituted or unsubstituted aryl group or a substituted or unsubstituted aralkyl group or allyl group and m is 0 or 1.

Among the heterocylic ring formed by $Z_1$, preferred examples are nitrogen atom containing heterocyclic ring such as pyridine, thiazole, benzothiazole, oxazole, benzoxazole, naphthoxazole, naphthothiazole, imidazole, benzimidazole, naphthoimidazole, 2-quinoline, 4-quinoline, iso-quinoline, indole and indolenine rings. These heterocyclic rings may be substituted with a substitutent, for instance, a halogen atom such as F, Cl, Br and I; a substituted or unsubstituted alkyl group such as methyl, ethyl, sulfoethyl, sulfopropyl, sulfobutyl, hydroxyethyl, propynyl, iso-propyl, octyl, hexadecyl, methoxy-ethyl and tert-amiyl groups; a substituted or unsubstituted aryl group such as phenyl, tolyl, xylyl, chlorophenyl and methoxy-phenyl groups; a substituted or unsubstituted aralkyl group such as benzyl, 2-phenylethyl, 3-phenylpropyl, alpha-naphthylmethyl, methybenzyl, chloro-benzyl and methoxybenzyl groups; a substituted or unsubstituted alkoxy group such as methoxy, ethoxy 4-sulfo-butoxy and 3-sulfopropyl groups; nitro group, hydroxyl group or carboxyl group.

Particularly preferred heterocyclic rings are a benzothiazole ring, a benzimidazole rings, 2- or 4-quinoline ring or an indole ring which are substituted with an N-alkyl or an N-substituted alkyl group, among others.

General Formula (7):

$=CH-R_{10}$ wherein $R_{10}$ represents a substituted or unsubstituted aryl group.

Particularly preferred substituents represented by $R_{10}$ are a substituted or unsubstituted phenyl group having 6 to 20 carbon atoms or a substituted or unsubstituted naphthyl group having 10 to 30 carbon atoms. Concrete examples thereof include phenyl, tolyl, xylyl, biphenyl, alpha-naphtyl, betanaphthyl, methoxy-phenyl, dimethoxyphenyl, trimethoxyphenyl, ethoxyphenyl, diethoxyphenyl, chlorophenyl, trichlorophenyl, bromophenyl, dibromophenyl, tribromophenyl, ethylphenyl, diethylphenyl, nitrophenyl, aminophenyl, dimethylaminophenyl, dibenzylaminophenyl, dipropylaminophenyl, morpholinophenyl, piperidinylphenyl, piperazinylphenyl, diphenylaminophenyl, acetylaminophenyl, benzoylaminophenyl, acetylphenyl, benzoylphenyl, cyano-phenylmethanesulfonamidophenyl, di-(2-hydroxyethyl)-amino-phenyl, N-ethyl-N-(2-methanesulfonamidoethyl)-aminophenyl and 4-dimethylamino-2-methylphenyl.

General Formula (8):

$=CH-R_{11}$ wherein $R_{11}$ represents a monovalent group derived from 5- or 6-membered heterocyclic ring.

Preferred heterocyclic group represented by $R_{11}$ are those derived from heterocyclic rings as pyridine, thiazole, benzothiazole, oxazole, benzoxazole, naphthothiazole, naphthoxazole, imidazole, benzimidazole, naphthoimidazole, 2-quinoline, 4-quinoline, iso-quinoline, indole, indolenine, furan, thiophene, benzofuran, thionaphthene, dibenzofuran, carbazole, phenothiazine, phenoxazine, 1,3,4-thiadiazole, 1,3,4-triazole, 1,3,4-oxadiazole, pyrazole and substituted derivatives thereof.

Among these heterocyclic groups, particularly preferred examples are those unsubstituted or substituted with the following substituents and having not more than 30 carbon atoms. Examples of such substituents for the heterocyclic group include hydroxyl group, a halogen atom such as F, Cl, Br and I; nitro group, carboxyl group, sulfonate group, a substituted or unsubstituted alkyl group having 1 to 20 carbon atoms in which the substituent therefore is, for example, a halogen atom such as F, Cl, Br and I, cyano group, carboxyl group, hydroxyl group, sulfo group, an alkoxyl group or a substituted or unsubstituted phenoxy group; substituted or unsubstituted phenyl group having 6 to 20 carbon atoms in which the substituents therefor are, for instance, a halogen atom such as F, Cl, Br and I, cyano group, nitro group, hydroxyl group, carboxyl group, sulfo group, an alkoxy group, sulfonamide group, carbonamide group, sulfamoyl group and carbamoyl group; carbonamide group, sulfonamide group, carbamoyl group, sulfamoyl group, a carboxylate group and ureido group.

General Formula (9):

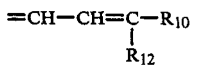

wherein $R_{12}$ represents hydrogen atom, an alkyl group or an aryl group and $R_{10}$ is the same as that defined above.

Preferred examples of the $R_{10}$ are the same as that already defined above. On the other hand, preferred examples of the substituent $R_{12}$ are hydrogen atom, an alkyl group having 1 to 20 carbon atoms such as methyl, ethyl, propyl and butyl group; a substituted or unsubstituted aryl group having 6 to 20 carbon atoms such as phenyl, tolyl, xylyl, biphenyl, ethylphenyl, chlorophenyl, nitrophenyl, aminophenyl, dimethylaminophenyl, alpha-naphthyl, p-naphthyl, anthryl and pyrenyl group.

Particularly preferred examples of the substituent $R_{12}$ are hydrogen atom, an alkyl group having 1 to 17 carbon atoms or a substituted or unsubstituted phenyl group having 6 to 20 carbon atoms.

General Formula (10):

$$=CH-C\equiv C-R_{10}$$

wherein $R_{10}$ has the same meanings as that defined above.

General Formula (11):

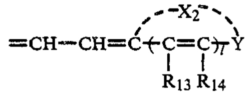

wherein the substituent $X_2$ represents an atomic group required to complete a ring such as pyran, thiapyran, selenapyran, benzopyran, benzothiapyran, benzoselenapyran, naphthopyran, naphthothiapyran, naphthoselenapyran, tellurapyran, benzotellurapyran or naphthotellurapyran which may or may not be substituted. l represents 0 or 1. $R_{13}$ and $R_{14}$, respectively, represent a hydrogen atom, an alkyl group, an alkoxyl group, an aryl group, styryl group, 4-phenyl-1,3-butadienyl group or a heterocyclic group, these groups being able to have substituents. Y represents O, S or Se.

Among the groups represented by the general formula (11), preferred examples are those in which $X_2$ is an atomic group required to form pyran, thiapyran, benzopyran or benzothiapyran ring, l is 1 or 2, Y is O or S, $R_{13}$ and $R_{14}$ independently represent hydrogen atom, a linear, branched or cyclic alkyl group having 1 to 20 carbon atoms, a substituted or unsubstituted phenyl group having 6 to 20 carbon atoms in which the substituent therefor is, for instance, a halogen atom such as F, Cl, Br and I, an alkyl group, an alkoxyl group, carbonamide group, carbamoyl group, sulfonamide group, sulfamoyl group, ureido group and a carboxylate group; a substituted or unsubstituted styryl group having 8 to 20 carbon atoms such as styryl, p-methyl-styryl, o-chlorostyryl or p-methoxystyryl group; or a 5- or 6-membered substituted or unsubstituted heterocyclic group such as quinolyl, pyridyl, furyl, carbazolyl, imidazolyl, thiazolyl, oxazolyl, benzoimidazolyl, benzothiazolyl, benzoxazolyl, 1,3,4-thiadiazolyl, 1,3,4-oxadiazolyl or 1,3,4-triazolyl group.

General Formula (12):

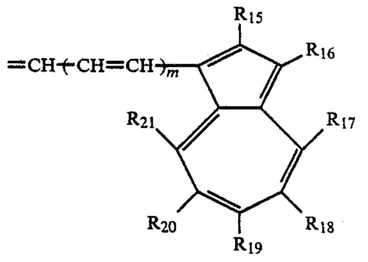

wherein $R_{15}$ to $R_{21}$ are respectively the same as $R_1$ to $R_6$ defined above in connection with the compounds represented by the general formula (I) and m is an integer of 0, 1 or 2.

Hereunder, compounds of aza-azulenium salts which may be used in the present invention will be illustrated as exemplary compounds, however, it should be understood that the scope of this invention is not restricted to these specific compounds.

Examples of the Compounds of the General Formula (1):

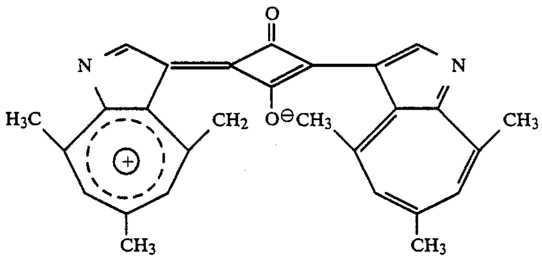
(1)
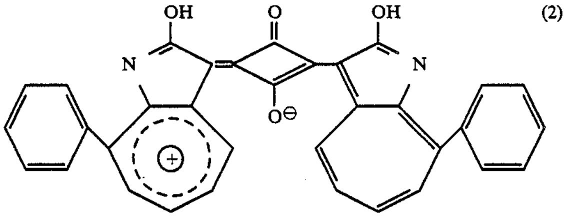
(2)
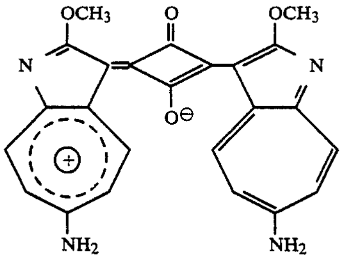
(3)
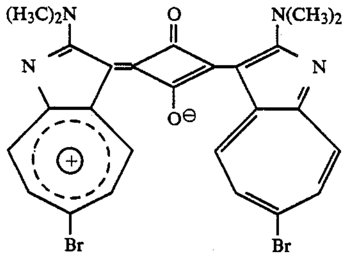
(4)
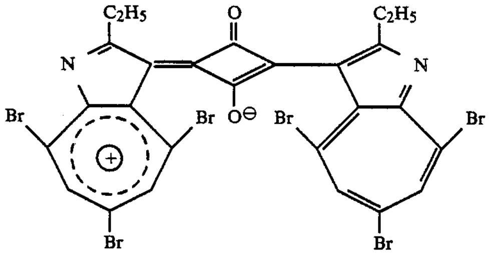
(5)
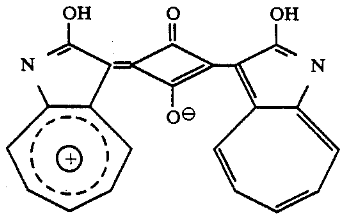
(6)
-continued
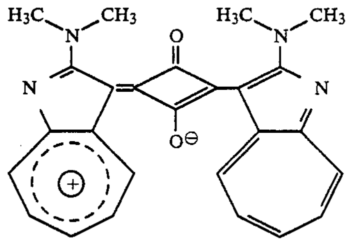
(7)
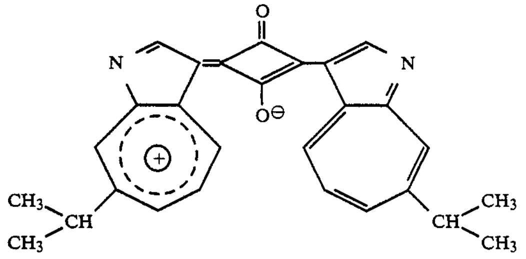
(8)
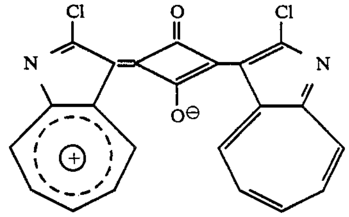
(9)
Examples of the Compounds of the General Formula (2):
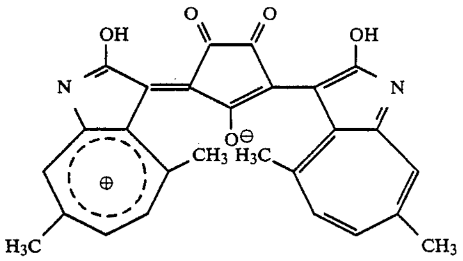
(10)
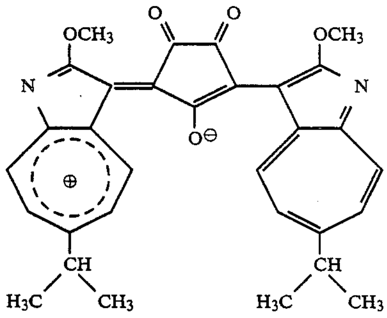
(11)
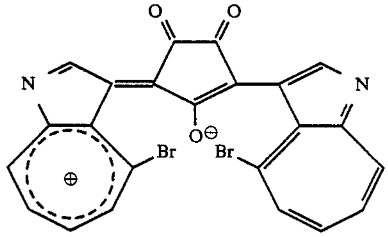
(12)

-continued
(13)
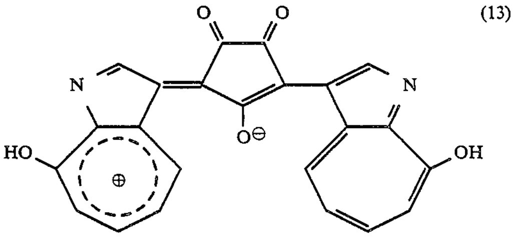
(14)
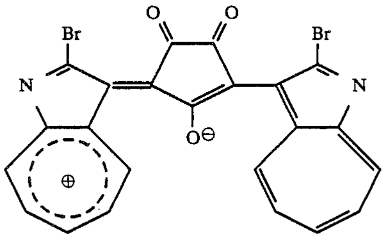
(15)
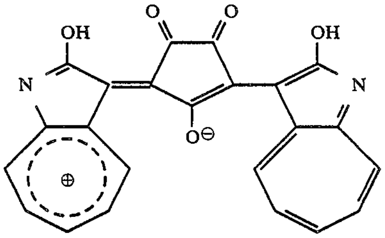
Examples of the Compounds of the General Formula (3):
(16)
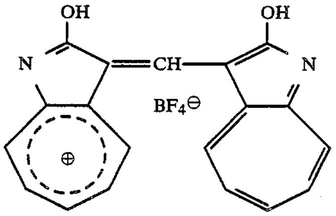
(17)
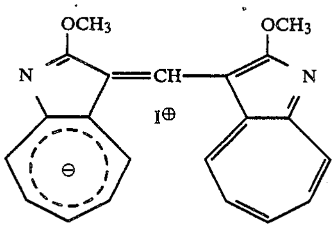
(18)
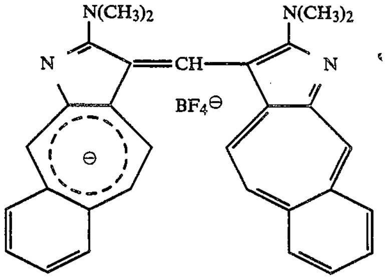
-continued
(19)
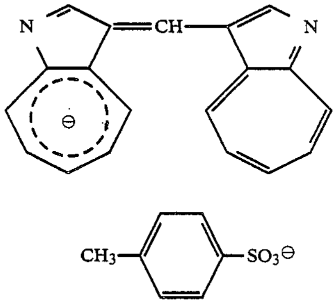
(20)
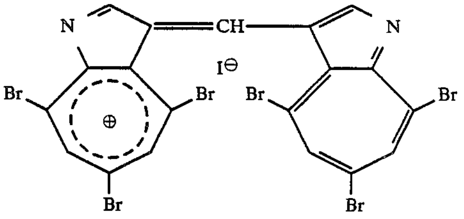
Examples of the Compounds of the General Formula (4):
(21)
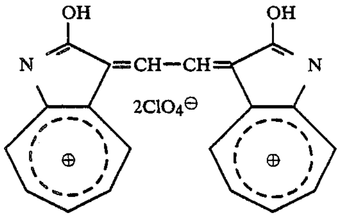
(22)
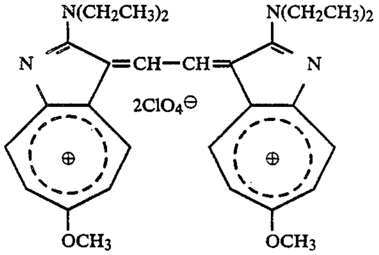
(23)
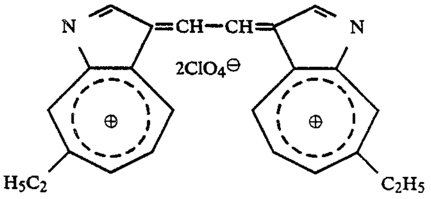
Examples of the Compounds of the General Formula (5):

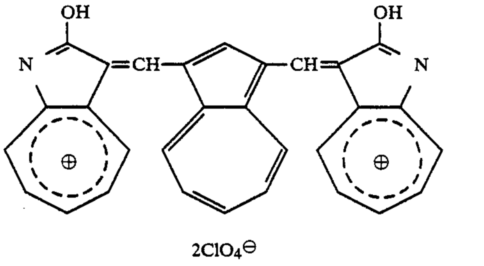
(24)
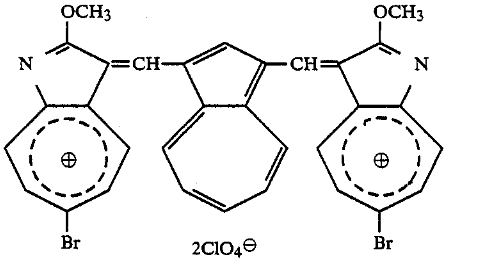
(25)
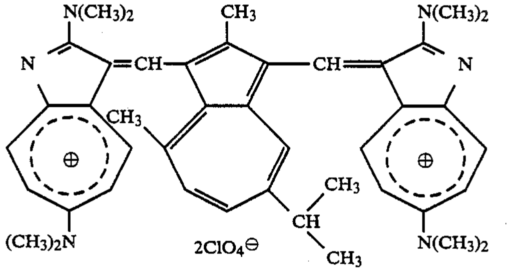
(26)
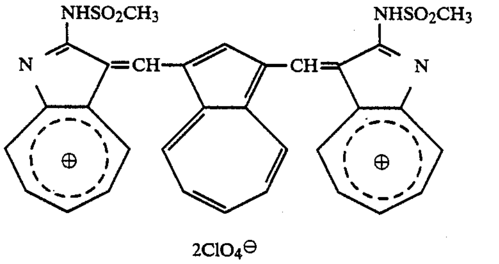
(27)
Examples of the Compounds of the General Formula (6):
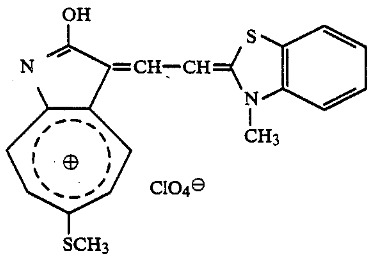
(28)
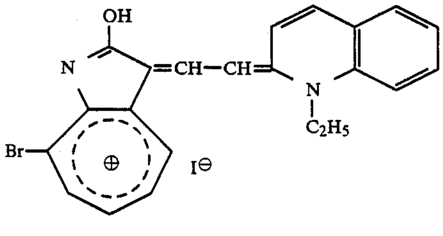
(29)
-continued
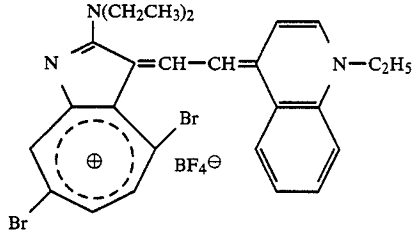
(30)
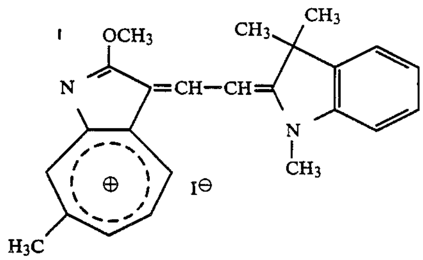
(31)
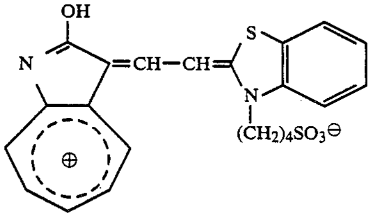
(32)
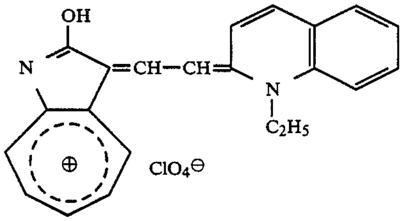
(33)
Examples of the Compounds of the General Formula (7):
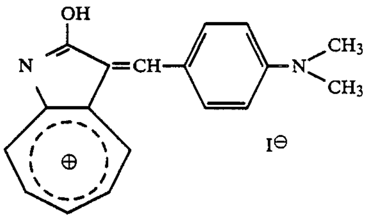
(34)
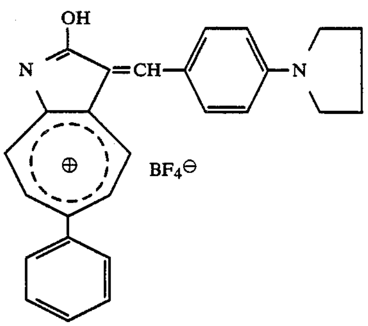
(35)

-continued
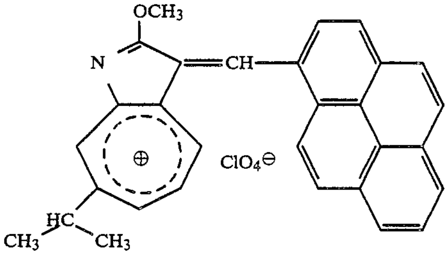
(36)
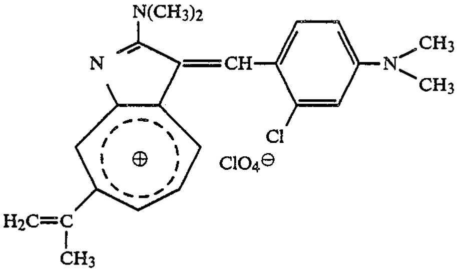
(37)
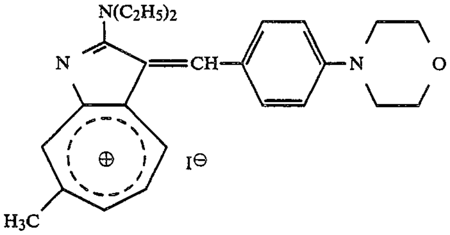
(38)
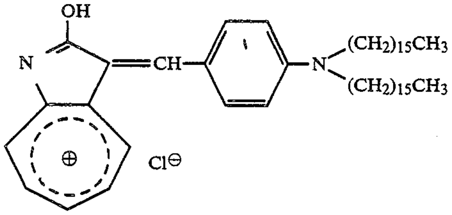
(39)
Examples of the Compounds of the General Formula (8):
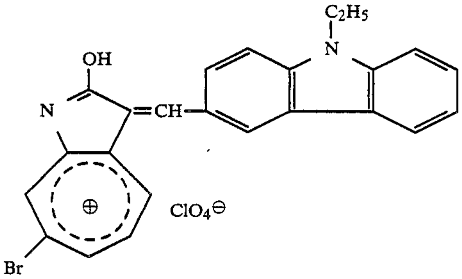
(40)
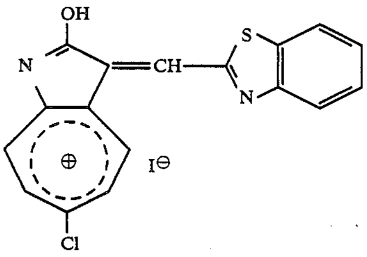
(41)
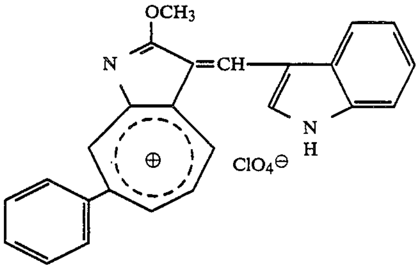
(42)
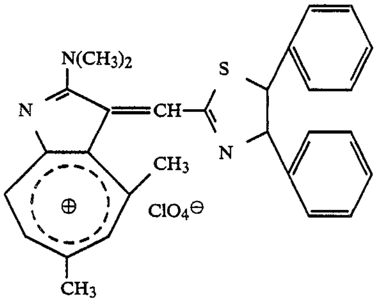
(43)
Examples of the Compounds of the General Formula (9):
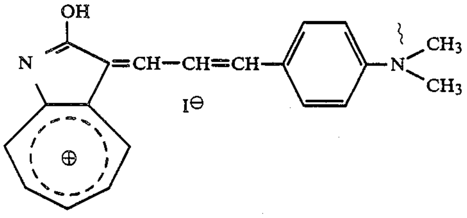
(44)

-continued
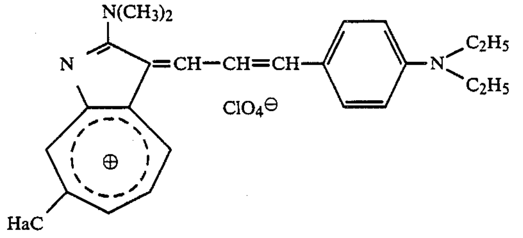
(45)
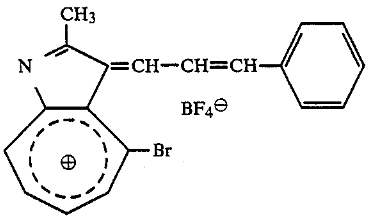
(46)
(47)
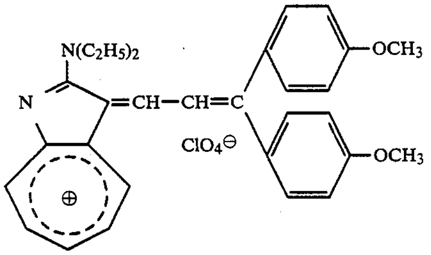
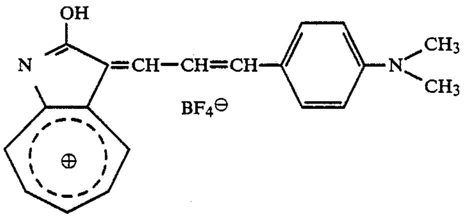
(48)
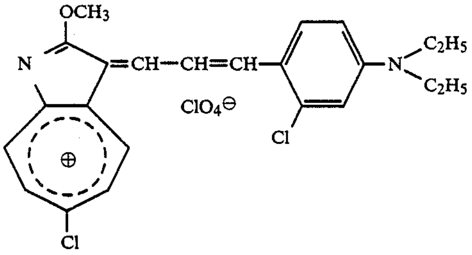
(49)
(50)
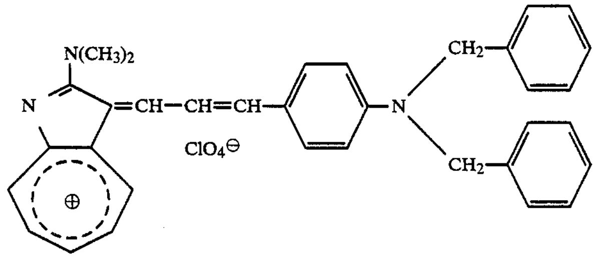
Examples of the Compounds of the General Formula (10):

(51)

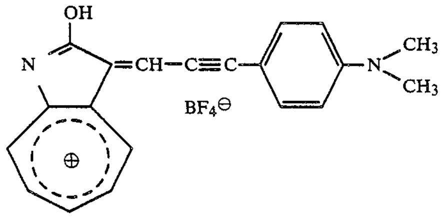

(52)

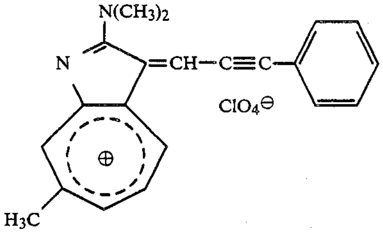

(53)

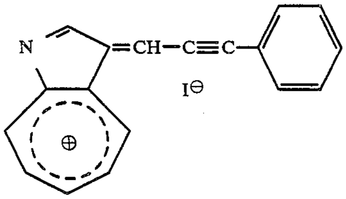

Examples of the Compounds of the General Formula (11):

(54)

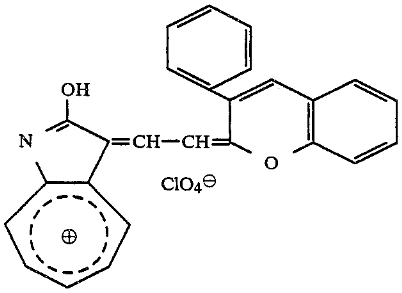

(55)

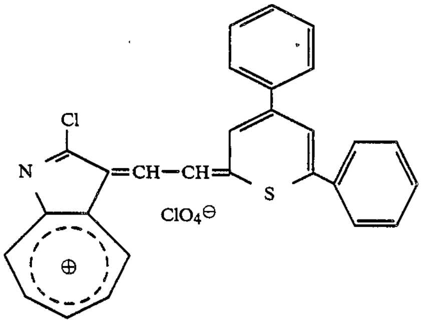

(56)

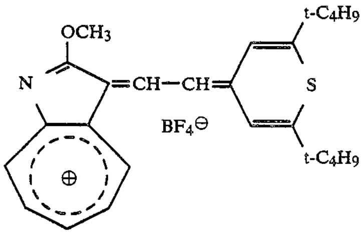

-continued (57)

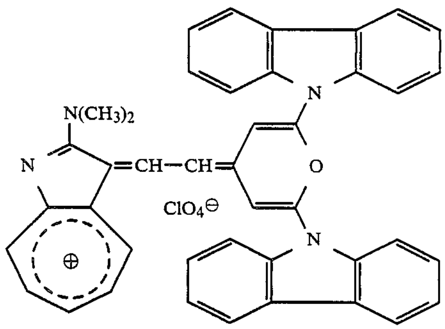

Examples of the Compounds of the General Formula (12):

(58)

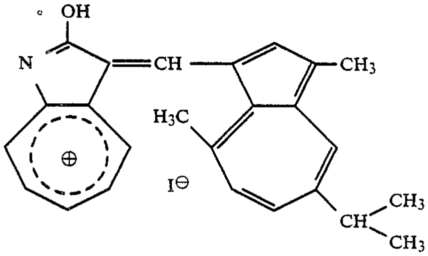

(59)

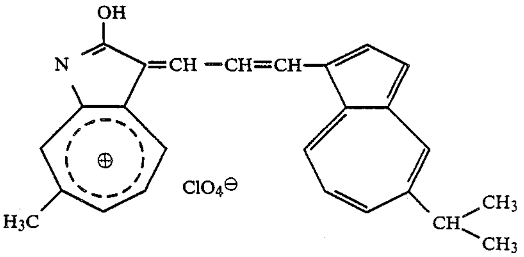

(60)

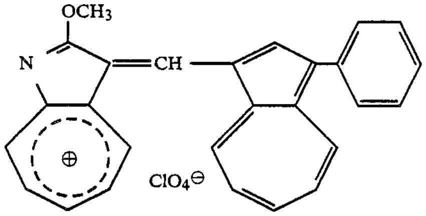

(61)

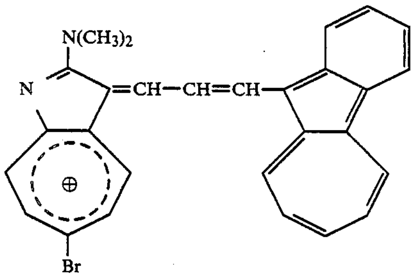

Among the compounds represented by the general formula (I), those in which the organic group A is represented by the general formula (1) or (2) may be prepared by reacting an aza-azulene compound with squalic acid or croconic acid in a proper solvent according to the procedures similar to those disclosed in Angevandte Chemie, 1966, 78-20, p. 937. In this connection, the aza-azulene compounds may be prepared according to the method of Nozoe, Chemistry and Industry, 1954, pp. 1357–1358. Among the compounds having A represented by the general formula (3), those in which n is equal to 0 may be obtained by reacting 1-formyl-azulene compound with a corresponding aza-azulene compound instead of an azulene compound under the presence of a strong acid in a proper solvent as described in J. Chem. Soc., 1960, p. 501; or by reacting 1-ethoxymethyleneazulenium salt with a corresponding aza-azulene compound instead of an azulene compound in a proper solvent as described in J. Chem. Soc., 1961, pp. 1724–1730; or by reacting 2-hydroxymethylenecyclohexanone and an azulene compound in the presence of a strong acid in a proper solvent while heating as disclosed in J. Chem. Soc., 1961, p. 3579–3593.

Among the compounds having the substituent A represented by the general formula (3), those in which n is equal to 1 or 2 may be prepared by reacting an aza-azulene compound with a malodialdehyde or a glutacondialdehyde in the presence of a strong acid in a proper solvent according to the descriptions disclosed in J. Chem. Soc., 1961, pp. 3579–3593. Moreover, the compounds having the substituent A represented by the general formula (4) may easily be obtained by heating an aza-azulene compound and glyoxal in the presence of a strong acid in a proper solvent according to the descriptions disclosed in J. Chem. Soc., 1961, p, 3588.

The compounds having the substituent A represented by the general formula (5) may be prepared by heating 1,3-diformyl-azulene compound and an aza-azulene compound in the presence of a strong acid in a proper solvent according to the descriptions described in J. Chem. Soc., 1960, p. 501.

The compounds having the substituent A represented by the general formula (6) may be prepared by heating 3-formylaza-azulene compound and a compound of heterocyclic quaternary ammonium salt having an active methyl group in a proper solvent according to the procedures as those disclosed in J. Chem. Soc., 1961, pp. 163–167.

The compounds having the substituent A represented by the general formula (7), (8), (9) or (10) can be obtained by reacting an aza-azulene compound with a corresponding aldehyde compound in the presence of a strong acid in a proper solvent according to the same descriptions as those described in J. Chem. Soc., 1958, pp. 1110–1117; ibid., 1960, pp. 494–501; and ibid., 1961, pp. 3579–3593.

The compounds having the substituent A represented by the general formula (11) may be obtained by reacting 3-formylaza-azulene compound with a compound represented by the following general formula (13) in a proper solvent:

General Formula (13):

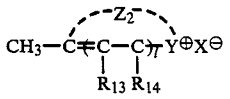

wherein $Z_2$, y+, $R_{13}$, $R_{14}$, $X^{\ominus}$ and l have the same meanings as those defined above respectively.

The solvents which may be used in the foregoing synthetic reactions are, for example, alcohols such as ethanol, butanol and benzylalcohol; nitriles such as acetonitrile and propionitrile; organic carboxylic acids such as acetic acid; acid anhydrides such as acetic anhydride and alicyclic ethers such a dioxane and tetrahydrofuran. In addition, it is also possible to use a mixture of an alcohol such as butanol and benzylalcohol with aromatic hydrocarbons such as benzene and toluene. The temperature of these reactions may vary from room temperature to the boiling point of the solvent used.

The compounds having the substituent A represented by the general formula (12) may be prepared by reacting 1-formylazulene compound with an aza-azulene compound in the presence of a strong acid in a proper solvent according to the same descriptions as those described in J. Chem. Soc., 1960, p. 501.

The processes for preparing the compounds represented by the general formula (I) with hereunder be explained in more detail with reference to the following concrete examples:

PREPARATION 1: Synthesis of Compound (34)

In 100 ml ethanol, there were dissolved 4 g of 4-N,N-di-methylbenzaldehyde, 4.1 g of cyclohepta[b]pyrrole-2-(1H)-one (hereunder referred to as 1-aza-azulene) and 4.14 g of sodium iodide. After the addition of 5.3 g of p-toluene sulfonic acid monohydrate to the resulting solution, the mixture was stirred under heating for one hour. The mixture was cooled to room temperature before filtering off the resulting product, then the product was washed with 100 ml of methanol and subsequently with 100 ml of acetone and was dried to obtain 4.4 g of an aza-azulenium salt. Yield: 37%; m.p.=not less than 280° C.

Visible Light Absorption Spectrum (in acetonitrile): Maximum Absorption Wave Length: 618 nm

| | Elemental Analysis (for $C_{18}H_{17}N_2IO$) | | | |
|---|---|---|---|---|
| | C (%) | H (%) | N (%) | I (%) |
| Theretical | 53.48 | 4.24 | 6.93 | 31.39 |
| Found | 53.64 | 4.09 | 6.90 | 31.21 |

PREPARATION 2: Synthesis of Compound (44)

8.75 g of 4-N,N-dimethylcinnamaldehyde and 7.25 g of 1-aza-azulanone were dissolved in 200 ml of ethanol. After the dropwise addition of 22.5 g of hydriodic acid to the solution obtained and stirring the mixture at room temperature for one hour, the mixture was refluxed under heating for 4 hours. The refluxed mixture was then cooled to room temperature before filtering off the resulting product, the product was washed with 100 ml of methanol and then 100 ml of acetone and thereafter dried to obtain 9.35 g of an aza-azulenium salt. Yield: 43%; m.p.=not less than 280° C.

Visible Light Absorption Spectrum (in aceonitrile): Maximum Absorption Wave Length: 721 nm

| | Elemental Analysis (for $C_{20}H_{19}N_2IO$) | | | |
|---|---|---|---|---|
| | C (%) | H (%) | N (%) | I (%) |
| Theretical | 55.83 | 4.45 | 6.51 | 29.49 |
| Found | 55.96 | 4.49 | 6.28 | 29.20 |

According to another aspect of the present invention, the recording layer of an optical recording medium may also comprise a quencher which may be any quenchers. As such a quencher, it is preferred to use a complex of a transition metal which makes it possible to lower the degree of deterioration during readout operation and has a good compatibility with dyes used. In this respect, preferred central metals include, for instance, Ni, Co, Cu, Pd and Pt.

Examples of novel quenchers include those represented by the following general formula (III) or (IV):

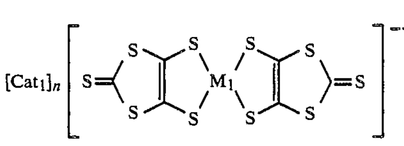
[III]

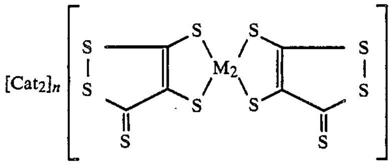
[IV]

wherein ($Cat_1$) and ($Cat_2$) are cationic ions required to neutralize these complexes, $M_1$ and $M_2$ represent nickel, copper, cobalt, palladium or platinum and n is an integer of 1 or 2.

Examples of the foregoing cationic ions ($Cat_1$) and ($Cat_2$) in the complexes represented by the general formula (III) or (IV) are inorganic cationic ions such as an alkali metal (eg., Li, Na and K); an alkaline earth metal (eg., Mg, Ca and Ba) and $NH_4^+$; and organic cationic ions such as quaternary ammonium ions and quaternary phosphonium ions.

Among the foregoing cationic ions ($Cat_1$) and ($Cat_2$), preferred examples thereof are those represented by the following general formula (V-a), (V-b), (V-c), (V-d) or (V-e):

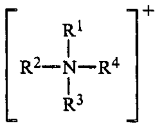
[V-a]

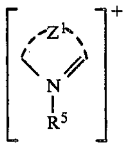
[V-b]

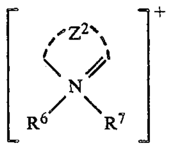
[V-c]

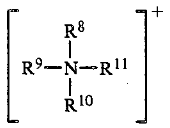
[V-d]

-continued

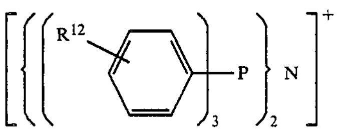
[V-e]

In the above general formulas (V-a) to (V-e), $R^1$ to $R^{12}$ respectively represent a substituted or unsubstituted alkyl group having 1 to 20 carbon atoms or a substituted or unsubstituted aryl group having 6 to 14 carbon atoms, $Z^1$ and $Z^2$ represent a non-metallic atomic group which forms a 5- or 6-membered ring together with nitrogen or phosphorous atom existing in each general formula.

Examples of the substituted or unsubstituted alkyl groups having 1 to 20 carbon atoms are methyl, ethyl, n-butyl, iso-amyl, n-dodecyl and n-octadecyl groups. Examples of the aryl groups having 6 to 14 carbon atoms include phenyl, tolyl and alpha-naphthyl groups.

The aforementioned alkyl or aryl group may be substituted with cyano, hydroxyl, an alkyl having 1 to 20 carbon atoms such as methyl, ethyl, n-butyl and n-octyl groups; an aryl group having 6 to 14 carbon atoms such as phenyl, tolyl and alpha-naphtyl groups; an acyloxy group having 2 to 20 carbon atoms such as acetoxy, benzoyloxy and p-methoxybenzoyloxy groups; an alkoxy group having 1 to 6 carbon atoms such as methoxy, ethoxy, propoxy and butoxy groups; an aryloxy group such as phenoxy and tolyloxy groups; an aralkyl group such as benzyl, phenethyl and anisyl groups; an alkoxycarbonyl group such as methoxycarbonyl, ethoxycarbonyl and n-butoxycarbonyl groups; an aryloxycarbonyl group such as phenoxycarbonyl and tolyloxy-carbonyl groups; an acyl group such as acetyl and benzoyl groups; an acylamino group such as acetylamino and benzoyl-amino groups; a carbamoyl group such as N-ethylcarbamoyl and N-phenylcarbamoyl groups; an alkylsulfonylamino group such as methylsulfonylamino and phenylsulfonylamino groups; a sulfamoyl group such as N-ethylsulfamoyl and N-phenylsulfamoyl groups; or a sulfonyl group such as mesyl and tosyl groups.

In addition, $Z^1$ and $Z^2$ represent a non-metallic atomic group required to form a 5- or 6-membered ring as already defined above. Examples of such 5- or 6-membered rings are pyridine, imidazole, pyrrole, 2-pyrroline pyrrolidine, piperidine, pyrazole, pyrazoline and imidazoline. Examples of the cations represented by the general formula (V-b) include dodecylpyridinium, hexadecylpyridinium and dodecylimidazolium groups. Examples of the cations represented by the general formula (V-c) include N-ethyl-N-hexadecylpiperidinium and N-ethyl-N-dodecylpyrazolium groups.

Among the cationic ions represented by the general formulas (V-a) to (V-e), particularly preferred examples thereof which may be used in the present invention are those represented by the general formulas (V-a), (V-b), (V-d) and (V-e), because of their easy availability and low manufacturing cost.

The kind of the cationic ions ($Cat_1$) and ($Cat_2$) exert an influence on the solubility of the compound represented by the aforementioned general formula (III) or (IV) in organic solvents.

In general, if the substituent bonded to a quaternary hetero atom is an alkyl group, the longer the chain length, the higher the solubility thereof. In particular, it is true in the case of tetra-alkyl substituted ammonium cation or phosphonium cation. The ammonium cation in which the total number of carbon atoms included therein is equal to at least 17 or the phosphonium cation in which the total number of the carbon atoms included therein is equal to at least 4 presents a high solubility in organic solvents.

In the compounds represented by the general formula (III) or (IV), examples of $M_1$ or $M_2$ are nickel, cobalt, copper, palladium and platinum which are arranged in order of effectiveness.

The metal complex of the general formula (III) or (IV) has a steric conformation of a planar 4-coordination. In addition, it cannot be unequivocally determined if the thioketone group is symmetrical or asymmetrical with respect to the central metal element in the compound of the general formula (IV), however, these compounds are herein expressed as the general formula (IV) for the purpose of simplicity.

The compounds represented by the general formula (III) or (IV) may be prepared according to the following procedures:

The compounds of the general formula (III) in which n is equal to 2 can be obtained by first converting disodium 1,3-dithiol-2-thione-4,5-dithiolate, which is produced by reacting carbon disulfide with sodium, to a zinc complex, reacting the resultant zinc complex with benzoyl chloride to form a bis-benzoylthio derivative, decomposing the derivative with an alkali and then reacting the decomposed product with a metal salt.

Moreover, the compounds of the general formula (III) in which n equals 1 can be prepared by oxidizing the complex obtained above (n=2) with a proper oxidizing agent.

On the other hand, the compounds of the general formula (IV) in which n is 2 may be prepared by first heating disodium 1,3-dithiol-2-thione-4,5-dithiolate, which is obtained by reacting carbon disulfide with sodium, to a temperature of about 130° C. to cause isomerization and to form disodium 1,2-dithiol-3-thione-4,5-dithiolate, converting the isomerized product to a zinc complex, reacting the zinc complex with benzoyl chloride to form a bis-benzoylthio derivative, decomposing the derivative with an alkali and then reacting the decomposed product with a metal salt.

In addition, the compounds of the general formula (IV) in which n is 1 may be obtained by oxidizing the complex prepared above (n=2) with a proper oxidizing agent.

The intermediate product for preparing the compounds represented by the general formula (III) or (IV), i.e., 1,3-dithiol-2-thione-4,5-dithiolate anion may be prepared according to electrochemical reduction in addition to the foregoing reduction method with sodium.

The preferred examples of the compounds represented by the general formula (III) are those listed below among others:

(III)-1

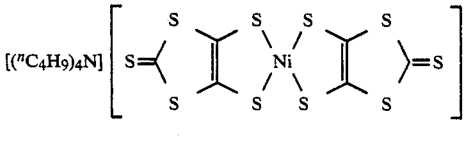

-continued (III)-2

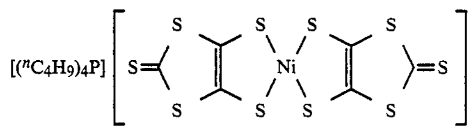

(III)-3

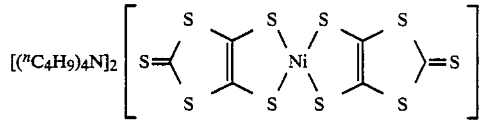

(III)-4

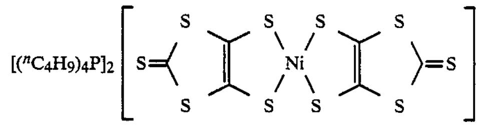

The method for preparing the compounds of the general formula (III) will hereunder be explained in reference to the following practical examples:

PREPARATION 3: Synthesis of Compound (III)-4

(1-1) Synthesis of Bis(tetraethylammonium)-bis(1,3-dithiol-2-thione-4,5-dithiolato) Zinc Complex.

All the reaction operations were carried out under an argon atmosphere. Metal sodium (23 g) was cut into small pieces and was dispersed in 180 ml of carbon disulfide. Thereafter, 200 ml of dimethylformamide was slowly added dropwise to the dispersion while stirring. At this stage, it should be prevented to cause a vigorous exothermic reaction. After the dropwise addition of the dimethylformamide, the resulting solution was gently heated and refluxed for 24 hours with caution. After the completion of the reaction, unreacted sodium was filtered off. Then, 50 ml of ethanol was added to the filtrate obtained and the mixture was agitated at room temperature for 2 hours. Carbon disulfide was distilled off from this solution under reduced pressure at room temperature. Then, 300 ml of water was added dropwise to the resultant solution, followed by filtration.

Then, a solution previously prepared by dissolving 20 g of zinc chloride in 500 ml of methanol and adding 500 ml of concentrated aqueous ammonia thereto was added to the reaction solution obtained above and the mixture was stirred for 5 minutes at room temperature. Thereafter, it was observed that red precipitates were separated out immediately after 53 g of tetraethylammonium bromide in 250 ml of water was added to the mixture. The precipitates were filtered off and dried in air to obtain a zinc complex.

(1-2) Synthesis of 4,5-Bis(benzoylthio)-1,3-dithiol-2-thione

The zinc complex (22 g) prepared in the process (1-1) was dissolved in 500 ml of acetone and the solution was filtered. To the stirred filtrate 150 ml of benzoyl chloride was added. Immediately after the addition thereof, yellow precipitates were separated off from the solution. The precipitates were filtered off and was dried after washing to obtain 16 g of the title compound.

(1-3) Synthesis of Compound (III)-4

The bis(benzoylthio) derivative (9.2 g) obtained in the foregoing process (1-2) was dissolved in 50 ml of methanol and 28% methanol solution of sodium methylate was added thereto followed by stirring for 10 minutes. To the resultant solution, 2.4 g of nickel chloride hexahydrate in 50 ml of methanol was added and the solution was stirred at room temperature for 30 minutes. A solution of 8.5 g of tetrabutylphosphonium bromide in 100 ml of methanol was added to the resultant solution and at this stage, black precipitates were immediately formed. After stirring the solution for additional 20 minutes, the precipitates were filtered off, washed with acetone, dried and recrystallized from acetone/iso-propyl alcohol to obtain the title compound. Yield: 3.8 g.

PREPARATION 4: Synthesis of Compound (III)-2

The nickel complex (1 g) obtained in the foregoing process (1-3) was dissolved in 60 ml of acetone, then 30 ml of acetic acid was added thereto, the mixture was stirred for 3 hours and then the solvent was distilled off to obtain black precipitates. The precipitates were recrystallized from acetone/methanol to obtain the title compound (III)-2. Yield:

0.4 g; m.p.=185° C.

$\lambda_{max}$: 1125 nm $\epsilon_{max}$: $2.51\times10^4$ (in $CH_2Cl_2$)

In the present invention, known quenchers may be used and examples thereof include the following compounds as disclosed in Japanese Patent Un-examined Publication No. 59-178295:

(i) Bisdithio-alpha-diketones:

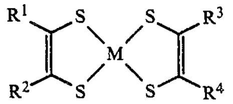

wherein $R^1$ to $R^4$ represent an alkyl group or an aryl group and M represents a bivalent transition metal element.

(iii) Bisphenyldithiols:

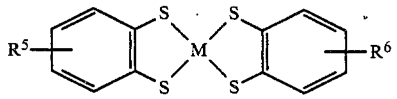

wherein $R^5$ and $R^6$ represent an alkyl grup or a halogen atom and M represents a bivalent transition metal element.

(iii) Acetylacetonato Chelates;
(iv) Dithiocarbamic Acid Chelates;
(v) Bisphenylthiols;
(vi) Thiocatechol Chelates;
(vii) Salicylaldehyde Oximes;
(viii) Thiobisphenolate Chelates;
(ix) Phosphonous Acid Chelates;
(x) Benzoates; and
(xi) Hindered Amines.

In addition to the foregoing compounds, aminium compounds or diimmonium compounds represented by the following general formula may also be used in the present invention and examples thereof include those manufactured and sold by NIPPON KAYAKU Co., LTD. under the trade name of IRG-002, IRG-003, IRG-022 AND IRG-033:

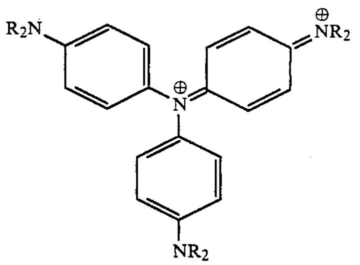

wherein R represents an alkyl grop or an aryl group.

In the present invention, it is also possible to use a combined compound formed from a cation of the foregoing dye and an anion of the quencher.

The quenchers are in general used in an amount of 0.05 to 12 moles, preferably from 0.1 to 1.2 moles per mole of the dye. The quenchers are preferably added to the recording layer of a dye film, however, they may be added to layers other than the recording layer.

The optical recording medium according to the present invention in general comprise a substrate and a recording layer formed thereon, however, it is also possible to provide layers such as an underlying layer, a protective layer and a reflective layer according to need.

In the present invention, any known substrates may be used and typical examples thereof include a glass and a plastic such as acrylic resin, polycarbonate, polysulfone, polyimide and polyester. The substrates may have a variety of forms or shapes and may be in the form of disc, card, sheet or rolled film.

The glass or plastic substrate may have a guide-groove for the purpose of simplifyingthe tracking operations during recording operation. An underlying layer of a plastic binder, an inorganic oxide or an inorganic sulfide may be applied to the surface of these glass or plastic substrates. In such a case, it is preferred to use an underlying layer of a material having a thermal conductivity lower than that of the substrate. The optical recording medium of the present invention may have a so-called airsandwich structure which can be realized by arranging 2 recording mediums so as to make the inner side of the one medium face to that of the other medium.

The recording layer of the recording medium according to the present invention comprises a single layer of the compound represented by the general formula (I) or a combination of such a compound with other materials; or comprises a reflective layer and a light absorbing layer containing the compound of the formula (I). The former may be produced according to a method comprising dissolving the compound of the formula (I) in a solvent and coating the resultant solution on a substrate or depositing the compound to a substrate; a method comprising preparing a mixed solution of the compound (I) and other dyes and then coating it on a substrate; a method comprising coating a mixture of the compound (I) and a resin solution on a substrate; or a method comprising preparing a resin solution containing the compound (I) together with other dyes and coating the solution on a substrate.

Examples of the resins which may be used for producing the recording layer include any known resins such as PVA, PVP, polyvinylbutyral, polycarbonate, nitrocellulose, polyvinylformal, methyl vinyl ether, chlorinated paraffin, maleic anhydride copolymer, styrene-butadiene copolymer and xylene resins. Preferably, the weight ratio of the compound represented by the general formula (I) to the resin existing in the recording layer is not less than 0.01.

As the dyes other than those represented by the formula (I), dyes which may absorb light of the wavelength outside that of the light emitted by semiconductor lasers may also be used in the present invention and examples thereof include triarylmethane type dyes, merocyanine type dyes,- cyanine dyes, azo dyes and anthraquinone dyes.

One or more of the recording layers may be applied to a substrate. The thickness of the recording layer in general falls within the range of 0.01 to 2 microns, preferably from 0.02 to 0.8 micron. Moreover, if the readout operation is effected based on the reflection of the irradiated light, particularly preferred thickness of the recording layer is equal to $\frac{1}{4}$ times the wavelength of the laser used or that multiplied by an odd number.

In the case where the recording medium has a reflective layer for a semiconductor laser or He-Ne laser, the recording medium is obtained by first forming a reflective layer on a substrate and then applying a recording layer onto the reflective layer according to the foregoing methods or by first applying a recording layer on a substrate and thereafter forming a reflective layer thereon.

The reflective layer may be formed according to any methods such as depositing technique, sputtering technique or ion plating technique. In addition to these techniques, the reflective layer may also be formed according to the method which comprises dissolving a metal salt or a metal complex in a water-soluble resin such as PVA and PVP, adding a reducing agent thereto, coating the solution on a substrate and then heating the resultant layer at a temperature of 50° to 150° C., preferably 60° to 100° C. to dry the layer.

In the foregoing method, the weight ratio of the metal salt or the metal complex to the resin falls within the range of 0.1 to 10, preferably 0.5 to 1.5. In this connection, it is desirable that the thickness of the reflective layer composed of metallic particles is 0.01 to 0.1 micron and that of the light absorbing layer is 0.01 to 2 microns in the recording layer of this type.

Examples of the metal salt or the metal complex which can be used in the present invention include silver nitrate, potassium silver cyanide, potassium gold cyanide, silver ammine complex; siler cyan complex, gold salt or gold cyan complex. Examples of the reducing agents as used herein are formalin, tartaric acid, tartrates, hypophosphites, sodium borohydride and dimethylamine borane. These reducing agent may be used in an amount of 0.2 to 10 moles, preferably 0.5 to 4 moles per mole of the metal salt or the metal complex.

Moreover, for the purpose of preventing the deterioration of the dyes used in the recording layer, an antioxidant or an anti-discoloration agent may be added to the recording layer or a layer adjacent thereto.

In the recording medium according to the present invention, information can be recorded by irradiating the recording layer with a spot-like high energy beam, from a light source such as a laser (e.g., semiconductor lasers or He-Ne laser) through the substrate or from the direction opposed to the substrate. The light absorbed by the recording layer is converted to thermal energy and forms pits on the recording layer.

On the other hand, the readout of the information recorded may be carried out by irradiating the recording layer with a laser beam having a power lower than the threshold value of the laser beam for recording the information and detecting the difference between the amount of the light reflected by portions on which pits are not formed and that are formed or between the amounts of the light transmitted through these portions.

In another embodiment of the recording medium according to the present invention, the recording layer may be prepared by, for example, dissolving a compound of the general formula (I) and a quencher in a proper organic solvent such as methanol, ethanol, isopropyl alcohol, dichoromethane, dichloroethane and acetone, adding a proper binder such as those listed above according to need and coating the resulting solution on a substrate according to any methods, for instance, spin coating technique; or by codepositing the compound (I) and the quencher on the substrate; or by vacuum depositing the compound (I) on the substrate and then coating the quencher thereon. If a binder is used, the amount of the binder is preferably 0.01 to 2 times the weight of the dye used. In addition, the compound of the general formula (I) may be used in the form of a Langmuir-Blodgett film.

Thus, according to the present invention, there is provided an optical recording medium having a high sensitivity and an extremely high stability to long term storage compared with those conventionally proposed. In other words the optical recording medium of this invention is excellent in heat resistance, resistance to moisture and resistance to light. Moreover, the recording medium of this invention presents a low deterioration during readout operation or in other words, a high resistance to readout and the recording medium is also excellent in storage stability.

The present invention will now be explained in more detail with reference to the following working examples and the effects practically attained according to the present invention will also discussed in comparison with comparative examples. However, it should be appreciated that the following examples are given only for illustrating the present invention and the scope of this invention is not restricted to these specific examples.

EXAMPLE 1

| | |
|---|---|
| Compound (44) | 0.1 g |
| Nitrocellulose | 0.6 g |
| Dichloromethane | 7 ml |

A solution of the above composition was applied to a glass plate according to rotational coating technique and the resulting coated plate was dried at 40° C. to obtain a recording layer of 0.40 microns in thickness. The reflectively and the absorptivity of the resultant recording layer at 780 nm were 14% and 25% respectively.

The recording medium thus obtained was then subjected to recording of signals of 1 MHz by irradiating it with a semiconductor laser beam of 780 nm in wavelength, 4 mW in power at the irradiated surface and 1.6 micron in beam diameter and whereby a pit of 1.0 micron in diameter was formed after the irradiation (1.6 nJ/pit) for 0.4 microseconds. The recording medium was stored at 60° C. and a humidity of 90%, in the presence of room light for one month, however, any change in the recording and readout properties were not observed.

EXAMPLE 2

| | |
|---|---|
| Compound (44) | 0.1 g |
| Polycarbonate Resin | 1.0 g |
| C.I. Acid Blue 83 (C.I. 42630) | 1.2 g |
| 1,2-Dichloroethane | 12 ml |

A solution of the aforementioned composition was applied to an acrylic resin plate, which was previously subjected to surface hardening treatment, according to rotational coating technique and the coated layer was dried at 60° C. to obtain a recording layer having a thickness of 0.4 micron. The reflectivity and the absorptivity of the resultant recording layer at 800 nm were 15% and 19% respectively. On the other hand, those of the layer at 630 nm were 13% and 60% respectively. Then, signals of 0.4 MHz were recorded by irradiating the recording layer with a laser beam of a semiconductor laser having a power at the irradiated surface of 6 mW, a beam diameter of 1.6 micron and a wavelength of 800 nm, thus, a pit of 1.0 micron in diameter was formed with the irradiation (6.0 nJ/lpit) for 1.0 microsecond. The recording of signals of 4 MHz was also carried out utilizing He-Ne laser having a beam diameter of 1.6 microns and a power aft the irradiated surface of 5 mW and thereby a pit of 1.0 micron in diameter was formed by the irradiation (1.6 nJ/pit) for 0.4 microsecond.

In addition, a test for examining storage stability was also carried out according to the same procedures as in EXAMPLE 1 and likewise it was found that the properties of the recording layer was not changed at all.

EXAMPLE 3

| | |
|---|---|
| Compound (44) | 0.1 g |
| Nitrocellulose | 0.7 g |
| Acetonitrile | 10 ml |
| Ethanol | 10 ml |

A coating solution having the foregoing composition was applied to a glass plate according to a rotational coating technique and the coated layer was dried at 40° C. to form a recording layer having a thickness of 0.40 microns. The reflectivity and the absorptivity of the resulting layer at 830 nm were 15% and 65% respectively.

Signals of 1 MHz were recorded using a laser beam of a semiconductor laser having a wavelength of 830 nm, a power at the irradiated surface of 4 mW and a beam diameter of 1.6 microns and thus a pit of 1.0 micron in diameter was formed with the irradiation (1.2 nJ/pit) for 0.3 microseconds. This recording medium was stored at 60° C. and a humidity of 90% under irradiation with room light for one month, however, no change was observed in the recording and readout properties of the recording medium.

EXAMPLE 4

| | |
|---|---|
| Compound (32) | 0.1 g |
| Polycarbonate Resin | 0.7 g |
| C.I. Acid Blue 83 (C.I. 42630) | 1.2 g |

-continued

| | |
|---|---|
| 1,2-Dichloroethane | 12 ml |

A solution of the foregoing composition was applied to an acrylic resin plate which was previously subjected to surface hardening treatment according to rotational coating technique and then the coated layer was dried at 60° C. to form a recording layer of 0.4 microns in thickness. The reflectivity and the absorptivity thereof at 830 nm were 16% and 56% respectively. Moreover, those of the layer at 630 nm were 13% and 68% respectively.

Signals of 0.4 MHz were recorded utilizing a laser beam of a semiconductor laser having a power at the irradiated surface of 6 mW, a beam diameter of 1.6 microns and a wavelength of 830 nm and thus a pit of 1.0 micron in diameter was formed with the irradiation (1.8 nJ/pit) for 0.3 microseconds. On the other hand, signals of 4 MHz were also recorded by irradiating the recording medium with a laser beam of He-Ne laser having a beam diameter of 1.6 microns and an energy at the irradiated surface of 5 mW, whereby a pit of 1.0 micron in diameter was formed with the irradiation (1.6 nJ/pit) for 0.4 microseconds.

Moreover, a test for determining the storage stability of the recording medium was carried out as in EXAMPLE 3, however, there was no change was observed in properties of the recording medium at all.

EXAMPLE 5

A solution having the following composition was applied to a disc of polycarbonate resin according to a rotational coating technique and the coated layer was dried to form an underlying layer of a thickness of 0.1 micron.

| | |
|---|---|
| Cellulose Acetate Butyrate | 0.8 g |
| Acetone | 32 ml |

Then, a solution of the following composition containing compound (32) was applied to the surfaceof the underlying layer according to a rotational coating technique and then the coated layer was dried to form a recording layer having a thickness of 0.4 microns.

| | |
|---|---|
| Compound (32) | 1 g |
| Polyvinylformal | 0.7 g |
| Dichloromethane | 10 g |

Moreover, a 0.1 micron thick silver layer was deposited in vacuo on the recording layer to form a recording medium. Two discs of the recording media thus obtained were opposed with the silver layers being faced to each other, through spacers disposed at the peripheral and central portions of the media to make a disc-like recording medium of the sandwich structure.

Pits of 0.9 micron in diameter were formed on the recording medium thus obtained by irradiating, for 0.7 microseconds (4.2 nJ/pit), the medium with a laser beam of a semiconductor laser having a wavelength of 830 nm, a beam diameter of 1.6 microns and a beam energy of 6 mW, the laser beam being irradiated from the side of the polycarbonate plate.

The recording medium thus recorded was stored at 80° C. and at a humidity of 90% under room light for 2 months. It was found that deterioration of recording and readout properties of the recording medium were not changed.

EXAMPLE 6

| | |
|---|---|
| Compound (44) | 0.1 g |
| Polyvinylformal | 0.7 g |
| Acetone | 6 ml |
| Iso-propyl Alcohol | 6 ml |

A solution having the aforementioned composition was applied to a 0.08 micron thick aluminum layer which had been deposited on a polycarbonate resin plate, according to a rotational coating technique and was dried to form a light absorbing layer of 0.6 microns in thickness. The reflectivity and the absorptivity thereof at 830 nm were 16% and 64% respectively. Then, signals of 2 MHz were recorded on the resultant recording medium by irradiating it with a laser beam from the side of polycarbonate resin substrate. The laser beam used was that of a semiconductor laser having a wavelength of 830 nm, an energy at the irradiated surface of 6 mW and a beam diameter of 1.6 microns. Thus, pits of 0.8 micron in diameter were formed with the irradiation (3.0 nJ/pit) for 0.5 microseconds.

The recording medium thus recorded was stored at a temperature of 60° C. and at a humidity of 90% under room light for one month. The recording properties of the recording medium and the readout properties of the pits recorded were not deteriorated.

EXAMPLE 7

| | |
|---|---|
| Nitrocellulose | 0.4 g |
| Dichloromethane | 10 ml |

A solution having the foregoing composition was applied to an acrylic resin plate according to a rotational coating technique to form an underlying layer and then the foregoing compound (44) was deposited in vacuo on the underlying layer to obtain a layer of 0.2 microns in thickness. Moreover, a solution of 0.5 g of gelatin in 10 ml of water was applied to the surface of the vacuum deposited layer in a manner of rotational coating to form a protective layer of 0.5 microns in thickness.

The recording medium thus obtained was irradiated, from the side of the substrate, with a laser beam of 830 nm in wavelength as in EXAMPLE 3 and pits having a diameter of 0.9 micron were formed thereon from the irradiation (2.0 nJ/pit) for 0.5 microsecond.

The recording medium was stored at a temperature of 60° C. and at a humidity of 90% under room light for one month. After the storage, it was found that the properties of the recording medium were not deteriorated.

EXAMPLE 8

The compounds listed in Table I were dissolved in a desired solvent (concn.=0.5%). The resulting solution was applied to PMMA substrate (1 mm in thickness) in a manner of a rotational coating technique and then dried to obtain a recording medium.

Then, signals of 1 MHz were recorded on the resultant recording medium by irradiating it with a laser beam of a semiconductor laser having a wavelength of 830 nm, an energy at the irradiated surfaceof 6 mW and a beam diameter of 1.5 microns at a line speed of 1.2 m/sec. The readout of the signals were carried out by irradiating the recorded portions with a laser beam of 0.2 mW.

The recording medium was stored at 90° C. and at a relative humidity (RH) of 90% for 10 days and the rate of deterioration was determined from the observed change in the transmittance with respect to light of 830 nm. In other words, a halflife was determined by measuring the variation in the transmittance of the medium with time and the reciprocal thereof was calculated to obtain relative velocity (that of the comparative compound was regarded as —1—).

Furthermore, the velocity of deterioration upon exposure to light, when the recording medium was left to stand under the irradiation with light from a tungsten lamp, was also determined. These results obtained are shown in the following Table I. As will be seen from the results listed in Table I, it is clear that the recording medium according to the present invention has a sufficient reflectivity and a high C/N ratio as well as has an excellent stability to heat and light.

TABLE I

| Sample No. | Compound | | Reflectivity (%), at 830 nm |
|---|---|---|---|
| 1 | 6 | acetonitrile | 26 |
| 2 | 34 | " | 24 |
| 3 | 41 | " | 25 |
| 4 | 44 | " | 29 |
| 5 | 50 | " | 30 |
| Comp. Ex. 1 | Comparative Compound a | " | 25 |
| Comp. Ex. 2 | Comparative Compound b | methyl ethyl ketone | 20 |

| Sample No. | C/N ratio (dB) | Velocity of Deterioration by Heat | Velocity of Deterioration by Light |
|---|---|---|---|
| 1 | 50 | 0.8 | 0.7 |
| 2 | 48 | 0.7 | 0.8 |
| 3 | 49 | 0.6 | 0.6 |
| 4 | 57 | 0.6 | 0.5 |
| 5 | 55 | 0.7 | 0.6 |
| Comp. Ex. 1 | 50 | 1 | 1 |
| Comp. Ex. 2 | 42 | 1.2 | 1.1 |

Comp. Compound a:

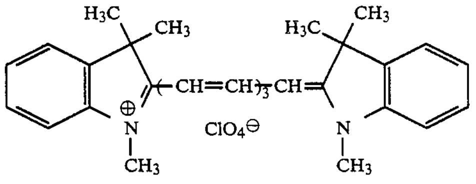

Comp. Compound b:

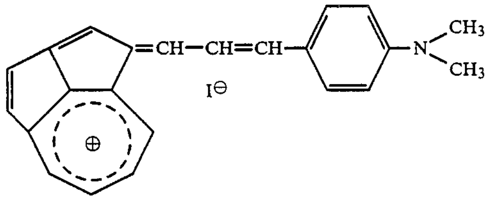

EXAMPLE 9

A dye (I), a quencher (II) and optionally a binder were dissolved in a solvent of methanol- methyl ethyl ketone-dichloroethane mixed in a proper ratio to form a coating solution. Then, each resultant coating solution was applied to a surface hardened acrylic resin plate so that the thickness thereof was 0.1 microns and the coated layer was dried to form a recording medium. In this respect, the weight ratio of the dye to the quencher was 3:1 and if a binder was used, the amount thereof was 1/5 of the weight of the dye.

Signals of 0.4 MHz were recorded on the recording medium thus obtained by irradiating the medium with a laser beam of a semiconductor laser under the conditions of 780 nm in wavelength, 6 mW in beam energy at the irradiated surface and 1.6 microns in beam diameter and it was found that pits of 1.0 micron in diameter were formed by the irradiation for 0.3 microseconds. The readout of the signals was carried out by irradiating the recorded portions with a laser beam of low power and the C/N ratio of the recording medium was determined from the results observed.

Then, the recording medium was further irradiated, for 10 minutes, with a laser light of 1 mW as a pulse having an interval of 1 microsecond (3 KHz) and a wavelength of 780 nm and the C/N ratio was determined from the result. Thereafter, the rate of reduction in the C/N ratio was determined from the C/N ratios observed before and after the irradiation with the pulse laser, and it was taken as the measure for the deterioration during readout.

In addition, the recording medium was stored at 60° C. and RH of 90% for 30 days to determine the C/N ratio. Then, the observed C/N ratio was compared with that observed before the storage to estimate the storage stability thereof.

The results thus observed are summarized in Table II below.

TABLE II

| Sample | Dye | Quen. | Binder | C/N (dB) | Det.1 (%) | Det.2 (%) |
|---|---|---|---|---|---|---|
| 1* | A | — | — | 53 | −48 | −20 |
| 2* | A | — | Bin.1 | 50 | −47 | −19 |
| 3* | A | a | — | 52 | −35 | −15 |
| 4* | A | a | Bin.1 | 50 | −20 | −9 |
| 5* | A | b | — | 52 | −21 | −9 |
| 6* | A | c | — | 53 | −19 | −9 |
| 7* | A | d | — | 51 | −35 | −17 |
| 8* | A | e | — | 52 | −28 | −17 |
| 9* | A | f | — | 52 | −30 | −16 |
| 10 | (6) | — | — | 54 | −21 | −10 |
| 11 | (6) | a | — | 54 | −7 | −8 |
| 12 | (6) | a | Bin.1 | 52 | −7 | −7 |
| 13 | (6) | b | — | 53 | −8 | −7 |
| 14 | (6) | c | — | 53 | −8 | −6 |
| 15 | (6) | d | — | 54 | −16 | −9 |
| 16 | (6) | e | — | 53 | −15 | −8 |
| 17 | (6) | f | — | 53 | −16 | −10 |
| 18 | (34) | g | — | 52 | −16 | −9 |
| 19 | (34) | a | — | 54 | −8 | −8 |
| 20 | (34) | b | — | 53 | −7 | −6 |
| 21 | (34) | b | Bin.2 | 51 | −8 | −7 |
| 22 | (34) | c | — | 52 | −7 | −7 |
| 23 | (34) | d | — | 53 | −15 | −10 |
| 24 | (34) | e | — | 54 | −16 | −9 |
| 25 | (34) | f | — | 52 | −15 | −11 |
| 26 | (34) | g | — | 51 | −17 | −12 |
| 27 | (41) | a | — | 53 | −7 | −7 |
| 28 | (41) | b | — | 54 | −7 | −6 |
| 29 | (41) | c | — | 55 | −7 | −7 |
| 30 | (41) | d | Bin.3 | 52 | −16 | −10 |
| 31 | (41) | e | — | 51 | −15 | −11 |
| 32 | (41) | f | — | 53 | −15 | −11 |
| 33 | (41) | g | — | 52 | −16 | −10 |
| 34 | (44) | a | — | 54 | −7 | −7 |
| 35 | (44) | b | — | 54 | −8 | −7 |
| 36 | (44) | c | — | 52 | −7 | −7 |
| 37 | (44) | d | Bin.1 | 51 | −16 | −10 |
| 38 | (44) | e | — | 53 | −16 | −10 |
| 39 | (44) | f | — | 53 | −15 | −11 |
| 40 | (44) | g | — | 52 | −16 | −11 |
| 41 | (50) | a | — | 53 | −7 | −7 |
| 42 | (50) | b | Bin.4 | 50 | −7 | −8 |
| 43 | (50) | c | — | 55 | −8 | −7 |
| 44 | (50) | d | — | 52 | −15 | −10 |
| 45 | (50) | e | — | 51 | −16 | −9 |
| 46 | (50) | f | — | 54 | −15 | −10 |
| 47 | (50) | g | — | 52 | −16 | −11 |
| 48 | B | — | — | 49 | −35 | −18 |
| 49 | B | — | Bin.1 | 47 | −33 | −18 |
| 50 | B | a | — | 48 | −35 | −14 |

In Table II, the terms abbreviated and the symbols used are as follows:

*This means that these samples are comparative ones.
Quen.: Quencher;
Det.1: Deterioration observed during readout;
Det.2: Deterioration observed after storage;
Bin.1: Nitrocellulose;
Bin.2: Polyvinylbutyral;
Bin.3: Chlorinated Paraffin;
Bin.4: Polyvinylformal.

Dye A:

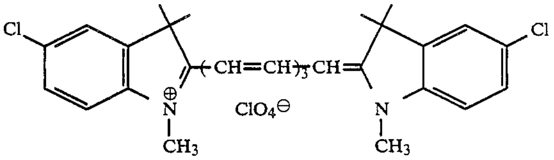

Dye B:

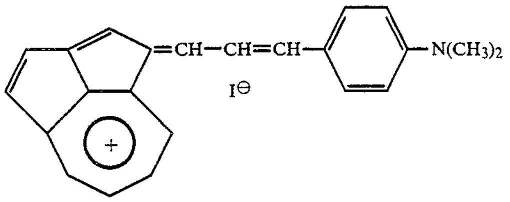

Quenchers:

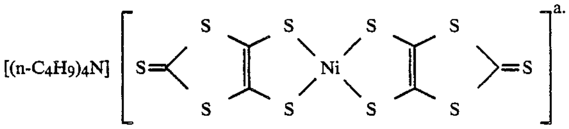

a.

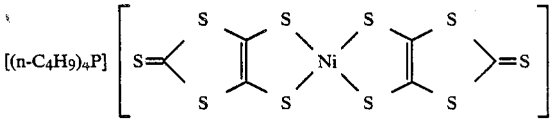

b.

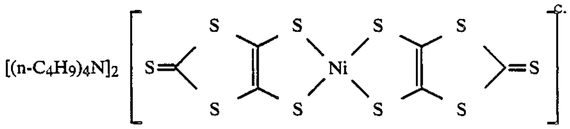

c.

-continued d.

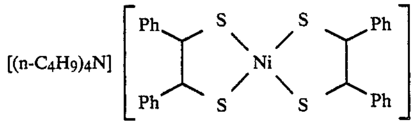

e.

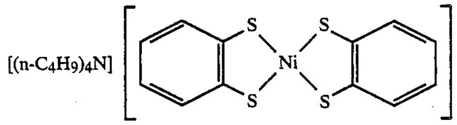

f.

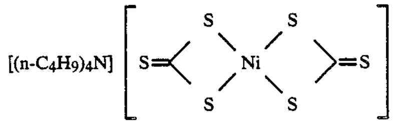

g.

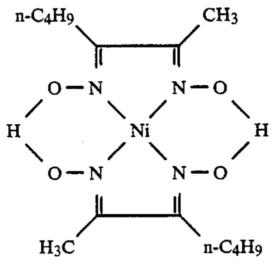

What is claimed is:

1. An optical information recording medium which comprises a substrate having provided thereon a recording layer and in which recording of information is carried out by irradiating the recording layer with a laser beam to thereby cause a change in the state of irradiated areas of the recording layer, or readout of the recorded information is carried out by irradiating the recording layer with a laser beam to read the information by differences in absorption or reflectance of the laser beam, wherein the recording layer contains a compound represented by the following general formula (I):

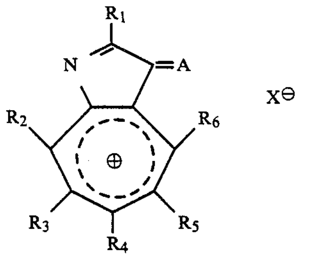

wherein:

$R_1$, $R_2$, $R_3$, $R_4$, $R_5$ and $R_6$ respectively represent a hydrogen atom, a halogen atom or a monvalent organic group;

A denotes a bivalent organic group which is bonded to the ring through a double bond; and $X^{\ominus}$ represents an anionic group and is present in a number required to neutralize existing cationic charges, provided that $X^{\ominus}$ may form an intramolecular salt together with either of $R_1$ to $R_6$ and A or that at least one of the following combinations, $R_2$ and $R_3$; $R_3$ and $R_4$; $R_4$ and $R_5$; $R_5$ and $R_6$ may form a substituted or unsubstituted aromatic carbocyclic ring or aromatic heterocyclic ring.

2. The optical recording medium as set forth in claim 1, in which the substituents $R_1$ to $R_6$ in general formula (I) represent a hydrogen atom, a halogen atom, hydroxyl group, nitro group, carboxyl group, sulfonate residue, mercapto group, or a monovalent organic group having 1 to 30 carbon atoms, respectively.

3. The optical recording medium as set forth in claim 2, in which the organic group having 1 to 30 carbon atoms is a substituted or unsubstituted alkyl group, a substituted or unsubstituted aryl group, a substituted or unsubstituted heterocyclic group, a substituted or unsubstituted aralkyl group, an acyl group, a substituted or unsubstituted amino group, a substituted or unsubstituted styryl group, a substituted or unsubstituted alkoxy group, a substituted or unsubstituted alkylthio group, a substituted or unsubstituted arylthio group, a substituted or unsubstituted heterocyclic thio group, a substituted or unsubstituted carbamoyl group, a substituted or unsubstituted alkoxycarbonyl group, a substituted or unsubstituted aryloxycarbonyl group or a substituted or unsubstituted arylazo group.

4. The optical recording medium as set forth in claim 3, in which the substituent $R_1$ is a member selected from the group consisting of a hydrogen atom, a hydroxyl group, a halogen atom, a substituted or unsubstituted alkyl group having 1 to 20 carbon atoms; a substituted alkoxy group having 1 to 10 carbon atoms; a substituted or unsubstituted phenyl group having 6 to 20 carbon atoms; a substituent represented by the general formula $-OCOR_7$ wherein $R_7$ represents a substituted or unsubstituted alkyl group, a substituted or unsubstituted aryl group or a substituted or unsubstituted aralkyl group, provided that the number of carbon atoms of these groups is not more than 20; or a mono- or di-substituted or unsubstituted amino group wherein the substituents are selected from the group consisting of a substituted or unsubstituted alkyl group having 1 to 20 carbon atoms, a substituted or unsubstituted acyl group having 1 to 20 carbon atoms, a substituted or unsubstituted phenyl group having 6 to 20 carbon atoms or a substituted or unsubstituted alkyl- or aryl-sulfonyl group having 1 to 20 carbon atoms provided that these substituents may form a ring therebetween; and the substituents $R_2$ to $R_6$ independently represent a hydrogen atom, a halogen atom, a substituted or unsubstituted alkyl group having 1 to 20 carbon atoms or a substituted or unsubstituted phenyl group having 6 to 20 carbon atoms; and $X^{\ominus}$ represents perchlorate, hexafluorophosphate, tetrafluoroborate, sulfoacetate, iodide, chloride, bromide, p-toluenesulfonate, an alkylsulfonate, an alkylsulfate, an alkyldisulfonate, a benzene disulfonate, a halosulfonate, picrate, tetracyanoethylene anion, tetracyanoquinodimethane anion, benzotriazole-5-sulfonate, 4-(2-methylthiotetrazol-1-yl)-benzenesulfonate, acetate, benzoate, sulfate, oxalate, fumarate or formate, provided that these anionic residues may form an intramolecular salt together with A or $R_1$ to $R_7$.

5. The optical recording medium as set forth in claim 4 in which the substituent A of general formula (I) is one selected from the group consisting of those represented by the following general formulas (1) to (12):

General Formula (1):

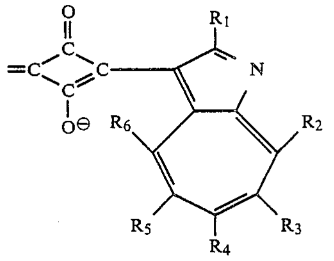

wherein $R_1$ to $R_6$ have the same meanings as those defined above in connection with general formula (I);

General Formula (2):

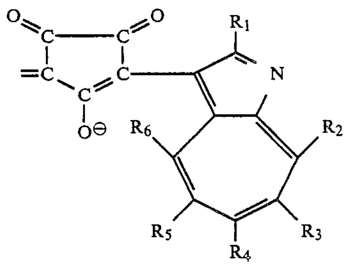

wherein $R_1$ to $R_6$ have the same meanings as those defined above in connection with the general formula (I);

General Formula (3):

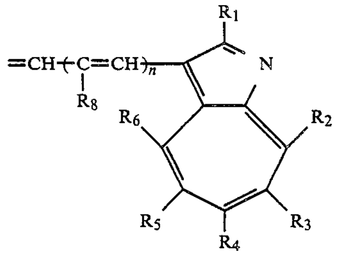

wherein $R_1$ to $R_6$ have the same meanings as those defined above in connection with general formula (I); $R_8$ represents a hydrogen atom, nitro group, cyano group, an alkyl group having 1 to 20 carbon atoms, an aryl group having 6 to 20 carbon atoms or an aralkyl group having 7 to 20 carbon atoms and n is an integer of 0, 1 or 2;

General Formula (4):

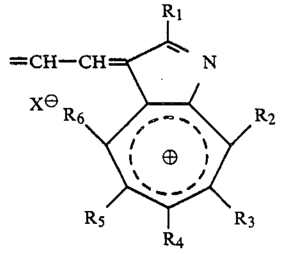

wherein $R_1$ to $R_6$ and $X^{\ominus}$ have the same meanings as those defined above in connection with general formula (I):

General Formula (5):

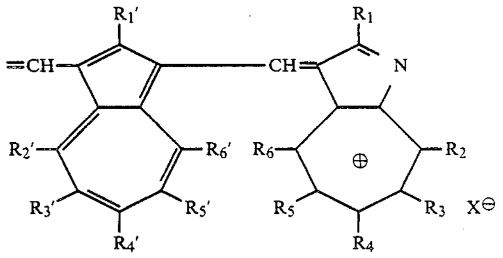

wherein $R_1$ to $R_6$ and $X^{\ominus}$ have the same meanings as those defined above in connection with general formula (I) and $R_1'$ to $R_6'$, respectively, have the same meanings as $R_1$ to $R_6$ defined above;

General Formula (6):

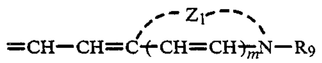

wherein $Z_1$ represents a non-metallic atomic group needed for forming a 5- or 6-membered heterocyclic ring, $R_9$ stands for a substituted or unsubstituted alkyl group, a substituted or unsubstituted aryl group or a substituted or unsubstituted aralkyl or allyl group and m is 0 or 1;

General Formula (7):

$=CH-R_{10}$ wherein $R_{10}$ represents a substituted or unsubstituted phenyl group having 6 to 20 carbon atoms or a substituted or unsubstituted naphthyl group having 10 to 30 carbon atoms;

General Formula (8):

$=CH-R_{11}$ wherein $R_{11}$ represents a heterocyclic group derived from pyridine, thiazole, benzothiazole, oxazole, benzoxazole, naphthoxazole, naphthothiazole, imidazole, benzimidazole, naphthoimidazole, 2-quinoline, 4-quinoline, iso-quinoline, indole, indolenine, furan, thiophene, benzofuran, thionaphthene, dibenzofuran, carbazole, phenothiazine, phenoxazine, 1,3,4-thiadiazole, 1,3,4-triazole, 1,3,4-oxadiazole, pyrazole or substituted derivatives thereof;

General Formula (9):

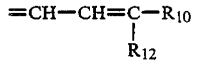

wherein $R_{12}$ represents a hydrogen atom, an alkyl group having 1 to 20 carbon atoms or a substituted or unsubstituted aryl group having 6 to 20 carbon atoms and $R_{10}$ is the same as that defined above;

General Formula (10):

$=CH-C\equiv C-R_{10}$ wherein $R_{10}$ has the same meanings as that defined above;

General Formula (11):

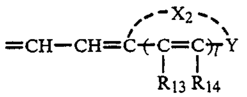

wherein $X_2$ represents an atomic group required to form a pyran, thiapyran, benzopyran, or benzothiapyran ring; l is an integer of 1 to 2; Y is O or S and $R_{13}$ and $R_{14}$ independently represent a hydrogen atom, a linear, branched or cyclic alkyl group having 1 to 20 carbon atoms, a substituted or unsubstituted phenyl group having 6 to °carbon atoms in which the substituents thereof are selected from the group consisting of halogen atoms, alkyl groups, alkoxy groups, carbonamide group, carbamoyl group, sulfonamide group, sulfamoyl group, ureido group and carboxylate groups; a substituted or unsubstituted styryl group having 8 to 20 carbon atoms or a 5- or 6-membered substituted or unsubstituted heterocyclic group; and General Formula (12):

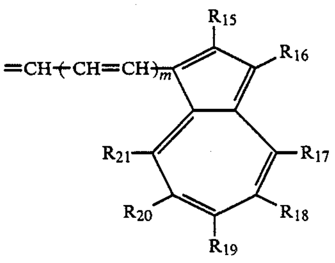

wherein $R_{15}$ to $R_{21}$ are respectively the same as $R_1$ to $R_6$ defined above and m is an integer of 0, 1 or 2.

6. The optical recording medium as set forth in claim 1, in which the optical recording medium is provided with at least one layer selected from the group consisting of an underlying layer, a protective layer, a reflective layer and combinations thereof.

7. The optical recording medium as set forth in claim 1, wherein the recording layer has a thickness of from 0.01 to 2 microns.

8. The optical recording medium as set forth in claim 7, wherein the thickness of the recording layer falls within the range of 0.02 to 0.8 microns.

9. The optical recording medium as set forth in claim 1, in which the substrate is provided with guide grooves for tracking.

10. An optical information recording medium which comprises a substrate having provided thereon a recording layer and in which recording of information is carried out by irradiating the recording layer with a laser beam to thereby cause a change in the state of irradiated areas of the recording layer, or readout of the recorded information is carried out by irradiating the recording layer with a laser beam to read the information by differences in absorption or reflectance of the laser beam, wherein the recording layer contains a dye represented by the following general formula (I):

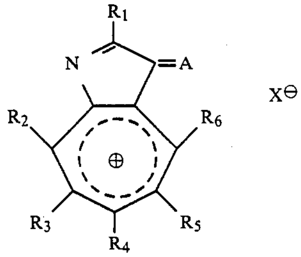

wherein:

$R_1$, $R_2$, $R_3$, $R_4$, $R_5$ and $R_6$ respectively represent a hydrogen atom, a halogen atom or a monovalent organic group;

A denotes a bivalent organic group which is bonded to the ring through a double bond; and $X^{\ominus}$ represents an anionic group and is present in a number required to neutralize existing cationic charges, provided that $X^{\ominus}$ may form an intramolecular salt together with either of $R_1$ to $R_6$ and A or that at least one of the following combinations, $R_2$ and $R_3$; $R_3$ and $R_4$; $R_4$ and $R_5$; $R_5$ and $R_6$ may form a substituted or unsubstituted aromatic carbocyclic ring or aromatic heterocyclic ring; and a quencher.

11. The optical recording medium as set forth in claim 10, in which the quencher is at least one member selected from the group consisting of formula (III) and (IV):

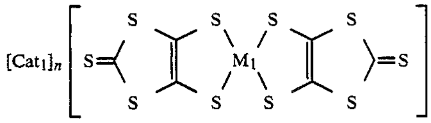

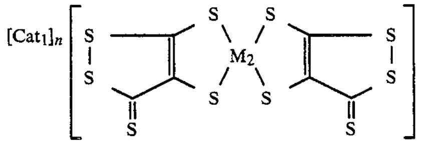

wherein ($Cat_1$) and ($Cat_2$) are cationic ions required to neutralize these complexes, $M_1$ and $M_2$ represent nickel, copper, cobalt, palladium or platinum and n is an integer of 1 or 2; bisdithio-alpha-diketones represented by the following formula:

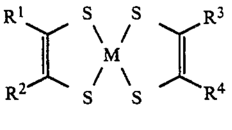

wherein $R^1$ to $R^4$ represent an alkyl group or an aryl group and M represents a bivalent transition metal element; bisphenyldithiols represented by the formula:

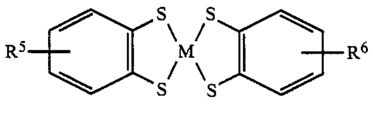

wherein $R^5$ and $R^6$ represent an alkyl group or a halogen atom and M represents a bivalent transition metal element; acetylacetonato chelates; dithiocarbamic acid chelates; bisphenylthiols; thiocatechol chelates; salicylaldehyde oximes; thiobisphenolate chelates; phosphonous acid chelates; benzoates; hindered amines and aminium or diimmonium compounds represented by the following formula:

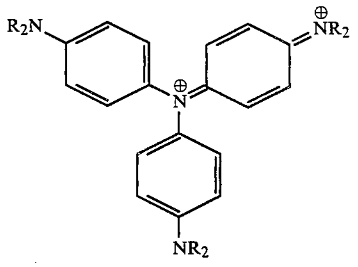

wherein R represents an alkyl group or an aryl group.

12. The optical recording medium as set forth in claim 10, in which a combination of a cationic dye and an anionic quencher is used in the recording layer.

13. The optical recording medium as set forth in claim 11, in which said ($Cat_1$) and ($Cat_2$) represent an alkali metal, an alkaline earth metal, $NH^+_4$, a quaternary ammonium ion or a quaternary phosphonium ion.

14. The optical recording medium as set forth in claim 13, in which said ($Cat_1$) and ($Cat_2$) are selected from the group consisting of general formulas (V-a), (V-b), (V-c), (V-d) and (V-e):

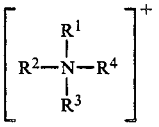

[V-a]

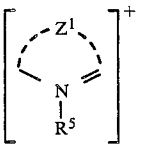

[V-b]

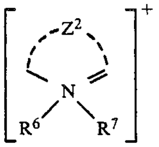

[V-c]

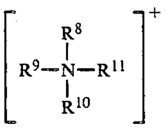

[V-d]

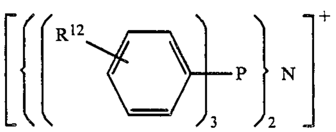

[V-e]

wherein $R^1$ to $R^{12}$ respectively represent a substituted or unsubstituted alkyl group having 1 to 20 carbon atoms or a substituted or unsubstituted aryl group having 6 to 14 carbon atoms and, $Z^1$ and $Z^2$ represent a non-metallic atomic group which forms a 5- or 6-membered ring together with a nitrogen atom existing in each formula.

15. The optical recording medium as set forth in claim 10, wherein the substituent $R_1$ in the general formula (I) is a member selected from the group consisting of a hydrogen atom, a halogen atom a, hydroxyl group, a substituted or unsubstituted alkyl group having 1 to 20 carbon atoms; a substituted or unsubstituted alkoxy group having 1 to 10 carbon atoms; a substituted or unsubstituted phenyl group having 6 to 20 carbon atoms; a substituent represented by the general formula: $-OCOR_7$, wherein $R_7$ represents a substituted or unsubstituted alkyl group, a substituted or unsubstituted aryl group or a substituted or unsubstituted aralkyl group, provided that the number of carbon atoms of these groups is not more than 20; or a mono- or di-substituted or unsubstituted amino group wherein the substituents are selected from the group consisting of a substituted or unsubstituted alkyl group having 1 to 20 carbon atoms, a substituted or unsubstituted acyl group having 1 to 20 carbon atoms, a substituted or unsubstituted phenyl group having 6 to 20 carbon atoms or a substituted or unsubstituted alkyl- or aryl-sulfonyl group having 1 to 20 carbon atoms provided that these substituents may form a ring therebetween; and the substituents $R_2$ to $R_6$ independently represent hydrogen atom, a halogen atom, a substituted or unsubstituted alkyl group having 1 to 20 carbon atoms or a substituted or unsubstituted phenyl group having 6 to 20 carbon atoms; and $X^\ominus$ represents perchlorate, fluoroborate, sulfoacetate, iodide, chloride, bromide, p-toluenesulfonate, an alkylsulfonate, an alkylsulfate, an alkyldisulfonate, a benzene disulfonate, a halosulfonate, picrate, tetracyanoethyleane anion, tetracyanoquinodimethane anion, benzotriazole-5-sulfonate, 4-(2-methylthiotetrazole-1-yl)-benzenesulfonate, acetate, benzoate, sulfate, oxalate, fumarate or formate, provided that these anionic residues may form an intramolecular salt together with A or $R_1$ to $R_7$.

16. The optical recording medium as set forth in claim 15, in which the substituent A of general formula (I) is a member selected from the group consisting of general formulas (1) to (12):

General Formula (1):

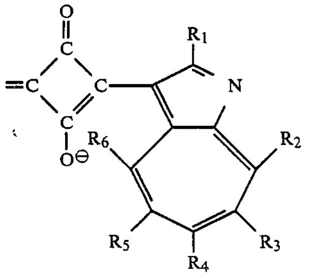

wherein $R_1$ to $R_6$ have the same meanings as those defined above in connection with general formula (I);

General Formula (2):

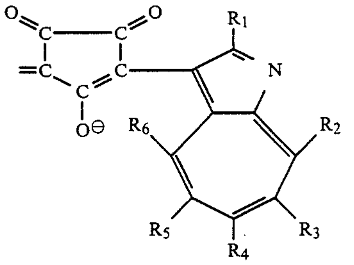

wherein $R_1$ to $R_6$ have the same meanings as those defined above in connection with general formula (I);

General Formula (3):

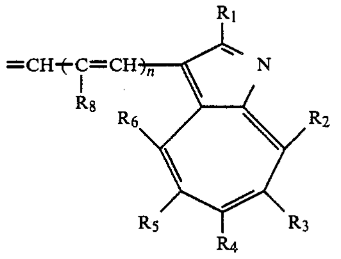

wherein $R_1$ to $R_6$ have the same meanings as those defined above in connection with the general formula (I); $R_8$ represents a hydrogen atom, nitro group, cyano group, an alkyl group having 1 to 20 carbon atoms, an aryl group having 6 to 20 carbon atoms or an aralkyl group having 7 to 20 carbon atoms and n is an integer of 0, 1 or 2;

General Formula (4):

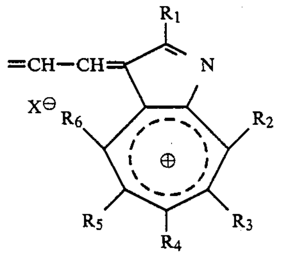

wherein $R_1$ to $R_6$ and $X^\ominus$ have the same meanings as those defined above in connection with general formula (I);

General Formula (5):

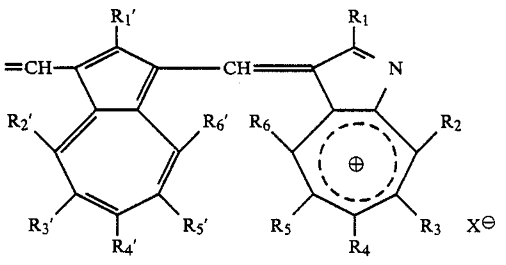

wherein $R_1$ to $R_6$ and $X^\ominus$ have the same meanings as those defined above in connection with general formula (I) and $R_1'$ to $R_6'$, respectively, have the same meanings as $R_1$ to $R_6$ defined above;

General Formula (6):

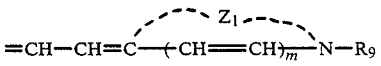

wherein $Z_1$ represents a non-metallic atomic group needed for forming 5- or 6-membered heterocyclic ring, $R_9$ represents a substituted or unsubstituted alkyl group, a substituted or unsubstituted aryl group or a substituted or unsubstituted aralkyl or allyl group and m is 0 or 1;

General Formula (7):

$=CH-R_{10}$ wherein $R_{10}$ represents a substituted or unsubstituted phenyl group having 6 to 20 carbon atoms or a substituted or unsubstituted naphthyl group having 10 to 30 carbon atoms;

General Formula (8):

$=CH-R_{11}$ wherein $R_{11}$ represents a heterocyclic group derived from pyridine, thiazole, benzothiazole, oxazole, benzoxazole, naphthoxazole, naphthothiazole, imidazole, benzimidazole, naphthoimidazole, 2-quinoline, 4-quinoline, iso-quinoline, indole, indolenine, furan, thiophene, benzofuran, thionaphthene, dibenzofuran, carbazole, phenothiazine, phenoxazine, 1,3,4-thiadiazole, 1,3,4-triazole, 1,3,4-oxadiazole, pyrazole, or substituted derivatives thereof;

General Formula (9):

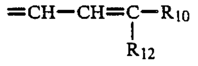

wherein $R_{12}$ represents a hydrogen atom, an alkyl group having 1 to 20 carbon atoms or a substituted or unsubstituted aryl group having 6 to 20 carbon atoms and $R_{10}$ is the same as defined above;

General Formula (10):

$=CH-C\equiv C-R_{10}$ wherein $R_{10}$ has the same meanings as that defined above;

General Formula (11)

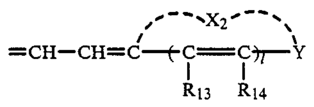

wherein $X_2$ represents an atomic group required to form pyran, thiapyran, benzopyran or benzothiapyran ring; l is an integer of 1 or 2; Y is O or S and $R_{13}$ and $R_{14}$ independently represent hydrogen atom, a linear, branched or cyclic alkyl group having 1 to 20 carbon atoms, a substituted or unsubstituted phenyl group having 6 to 20 carbon atoms in which the substituents thereof are selected from the group consisting of halogen atoms, alkyl groups, alkoxy groups, carbonamide group, carbamoyl group, sulfonamide group, sulfamoyl group, ureide group and carboxylate groups; a substituted or unsubstituted styryl group having 8 to 20 carbon atoms or a 5- or 6-membered substituted or unsubstituted heterocyclic group; and General Formula (12):

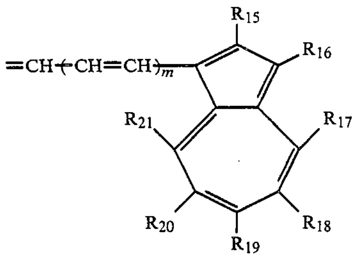

wherein $R_{15}$ to $R_{21}$ are respectively the same as $R_1$ to $R_6$ defined above and m is an integer of 0, 1 or 2.

17. The optical recording medium as set forth in claim 10, in which the optical recording medium is provided with at least one layer selected from the group consisting of an underlying layer, a protective layer, a reflective layer and combinations thereof.

18. The optical recording medium as set forth in claim 10, wherein the recording layer has a thickness of from 0.01 to 2 microns.

19. The optical recording medium as set forth in claim 18, wherein the thickness of the recording layer falls within the range of 0.02 to 0.8 micron.

20. The optical recording medium as set forth in claim 10, in which the substrate is provided with guide grooves for tracking.

21. The optical recording medium as set forth in claim 10, wherein the quencher is present in an amount of 0.05 to 12 moles per mole of dye.

* * * * *